(12) United States Patent
Mathea

(10) Patent No.: US 11,602,901 B2
(45) Date of Patent: Mar. 14, 2023

(54) DEVICE FOR APPLYING FLOWABLE MATERIAL TO A SUBSTRATUM THAT CAN BE ROTATED ABOUT AN AXIS OF ROTATION

(71) Applicant: dp polar GmbH, Eggenstein-Leopoldshafen (DE)

(72) Inventor: Hans Mathea, Eggenstein-Leopoldshafen (DE)

(73) Assignee: dp polar GmbH, Eggenstein-Leopoldshafe (DE)

( * ) Notice: Subject to any disclaimer, the term of this patent is extended or adjusted under 35 U.S.C. 154(b) by 45 days.

(21) Appl. No.: 17/410,218

(22) Filed: Aug. 24, 2021

(65) Prior Publication Data

US 2021/0379834 A1 Dec. 9, 2021

Related U.S. Application Data

(62) Division of application No. 15/573,355, filed as application No. PCT/EP2016/060480 on May 10, 2016, now Pat. No. 11,155,036.

(30) Foreign Application Priority Data

May 11, 2015 (DE) ..................... 10 2015 005 868.1

(51) Int. Cl.
*B29C 64/112* (2017.01)
*B33Y 10/00* (2015.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
CPC ... B29C 64/393; B29C 64/112; B29C 64/245; B33Y 30/00; B33Y 50/02
See application file for complete search history.

(56) References Cited

U.S. PATENT DOCUMENTS

2001/0035886 A1* 11/2001 Bradshaw .............. G11B 23/40
2004/0265413 A1 12/2004 Russell et al.
(Continued)

FOREIGN PATENT DOCUMENTS

WO 2014092651 A1 6/2014
WO 2016009426 A1 1/2016

*Primary Examiner* — Alison L Hindenlang
*Assistant Examiner* — Debjani Roy
(74) *Attorney, Agent, or Firm* — The Webb Law Firm

(57) ABSTRACT

A device for applying flowable material to a substratum rotated about an axis of rotation, in accordance with image data stored as pixels or vectors of a Cartesian coordinate grid in a first memory, has at least one printing head for discharging material drops of the flowable material, and is arranged above the substratum, and a controller for positioning the substratum in relation to the printing head and controlling the discharge of the material drops. In a second memory, special polar coordinate grid points arranged on circular lines and on first rays having a first angular distance and, in the direction of origin, on further rays having an angular distance from each other that is greater than the first angular distance are stored. The special polar coordinate grid points are transformed into coordinates of the Cartesian coordinate system, and are compared with the pixels of the image file.

10 Claims, 17 Drawing Sheets

(51) Int. Cl.
*B29C 64/393* (2017.01)
*B33Y 30/00* (2015.01)
*B33Y 50/02* (2015.01)
*G06V 10/75* (2022.01)
*B29C 64/245* (2017.01)
*B29C 64/209* (2017.01)
*B29C 64/241* (2017.01)
*G05B 19/4099* (2006.01)

(52) U.S. Cl.
CPC .......... *B29C 64/241* (2017.08); *B29C 64/245* (2017.08); *B33Y 10/00* (2014.12); *B33Y 30/00* (2014.12); *B33Y 50/02* (2014.12); *G05B 19/4099* (2013.01); *G06V 10/751* (2022.01); *G05B 2219/36565* (2013.01); *G05B 2219/49007* (2013.01)

(56) References Cited

U.S. PATENT DOCUMENTS

| | | |
|---|---|---|
| 2012/0165969 A1 | 6/2012 | Elsey |
| 2013/0189435 A1 | 7/2013 | Mackie et al. |
| 2016/0339724 A1 | 11/2016 | Munenaka et al. |
| 2017/0173886 A1 | 6/2017 | Menchik et al. |

* cited by examiner

DEVICE FOR APPLYING FLOWABLE MATERIAL TO A SUBSTRATUM THAT CAN BE ROTATED ABOUT AN AXIS OF ROTATION

CROSS REFERENCE TO RELATED APPLICATIONS

This application is a divisional application of U.S. patent application Ser. No. 15/573,355 filed on Nov. 10, 2017, which is the United States national phase of International Application No. PCT/EP2016/060480 filed on May 10, 2016, and claims priority to German Patent Application No. 102015005868.1 filed on May 11, 2015, the disclosures of which are hereby incorporated in their entirety by reference.

BACKGROUND OF THE INVENTION

Field of the Invention

The invention relates to an apparatus for applying flowable material onto a substrate that is rotatable about an axis of rotation, according to predetermined image data which are stored in a first memory as pixels or vectors of a specific Cartesian coordinate system, having at least one printing head which has a plurality of nozzles arranged at a nozzle distance from one another for discharging material droplets of the flowable material and which is arranged at a vertical distance from the substrate, and having a controller for positioning the substrate relative to the at least one printing head and for discharging the material droplets.

Moreover, the invention relates to a method for applying flowable material onto a substrate that is rotatable about an axis of rotation, according to predetermined image data which are stored in a first memory as pixels or vectors of a specific Cartesian coordinate system, wherein material droplets of the flowable material are applied onto the substrate by means of a printing head which has a plurality of nozzles arranged at a nozzle distance from one another.

Description of Related Art

Such an apparatus or such a method is known from, for example, US 2004/0265413 A1.

In the known apparatus, two printing head arrangements are arranged in printing head carriers which are fastened to carriages, by means of which they are displaceable over a circular-ring-shaped substrate in the radial direction. Material is applied to the circular-ring-shaped substrate by means of the printing head arrangements. Since the path along the inner circle of the circular ring is shorter than the path along the outer circle of the circular ring, the density of the material applied at the inner circle of the circular ring is greater than the density of the material applied at the outer circle of the circular ring.

In order to counteract this, the nozzles of the printing head arrangements are actuated in such a way that, in the case of a constant angular speed of the circular-ring-shaped substrate and a constant speed with which the printing head arrangements are moved over the substrate in the radial direction, they spray a trapezoidal area, the shorter base of which faces the inner circle of the circular ring. The structure of the known apparatus is complicated and susceptible to faults, in particular due to the displaceably arranged printing head devices. Geometric distortions and inhomogeneities may occur in the printed image. Since very many small printing heads are present, stitching is practically impossible. Moreover, the printing speed is relatively slow due to the time required for displacing the printing head arrangements.

It is a problem of the present invention to develop an apparatus of the type set forth at the outset and a method of the type set forth at the outset in such a way that a reliable workflow and a high printing speed and quality with great homogeneity of the printed image are obtained.

SUMMARY OF THE INVENTION

According to the invention, provision is made in an apparatus of the type set forth at the outset for a second memory to be present, in which special polar coordinate grid points of a specific polar coordinate grid are stored, said special polar coordinate grid points being arranged on circles which have a predetermined circumferential distance from one another and being arranged on first rays which have a first angular distance from one another and being arranged on further rays in the direction of the origin, said further rays having an angular distance from one another that is greater than the first angular distance, said special polar coordinate grid points being stored as Cartesian grid points in the coordinates of the specific Cartesian coordinate system, and for a computer to be present, by means of which the Cartesian grid points are compared to the pixels or the vectors of the image data.

In respect of the method, the problem specified above also can be solved by virtue of a second memory being present, in which special polar coordinate grid points of a specific polar coordinate grid are stored, said special polar coordinate grid points being arranged on circles which have a predetermined circumferential distance from one another and being arranged on first rays which have a first angular distance from one another and being arranged on further rays in the direction of the origin, said further rays having an angular distance from one another that is greater than the first angular distance, and by virtue of a computer being present, by means of which the pixels or vectors stored in the first memory are transformable into polar coordinates and the polar coordinate image data obtained thus are compared to the special polar coordinate grid points stored in the second memory.

The term "angular distance" relates to rays that extend through special polar coordinate grid points that are arranged next to one another on a circle, i.e. no further special polar coordinate grid point is arranged within the angular distance on the relevant circle between these special polar coordinate grid points.

In respect of the method of the type set forth at the outset, the aforementioned problem is solved by virtue of special polar coordinate grid points of a specific polar coordinate grid being determined, said special polar coordinate grid points being arranged on circles which have a predetermined circumferential distance from one another and being arranged on first rays which have a first angular distance from one another and said special polar coordinate grid points being arranged on further rays in the direction of the origin, said further rays having an angular distance from one another which is greater than the first angular distance, and the special polar coordinate grid points being transformed into coordinates of the specific Cartesian coordinate system, and the Cartesian grid points obtained thus being compared to the pixels or the vectors of the image file, or the pixels or vectors of the specific Cartesian coordinate system being transformed into polar coordinates, and the polar coordinate image data or polar coordinate points obtained thus being compared to the special polar coordinate grid points of the polar coordinate grid.

As a result of a second memory being present, in which polar coordinate points of a specific polar coordinate grid are stored, said polar coordinate points being arranged on circles which have a predetermined circumferential distance from one another and being arranged on first rays which have a first angular distance from one another and being arranged on further rays in the direction of the origin, said further rays having an angular distance from one another that is greater than the first angular distance, a grid in which the grid points are arranged in a manner similar to a Cartesian coordinate system advantageously is available. That is to say, the grid formed by the special points has a substantially uniform surface density everywhere. In contrast to the points of the specific polar coordinate grid, which have an increasing surface density with increasing closeness to the origin of the specific polar coordinate grid, the surface density of the special points of the specific polar coordinate grid does not change over the distance from the origin of the polar coordinate grid.

The specific polar coordinate grid or the grid formed from the special points is mapped onto the rotatable substrate, which is expediently embodied as a circular ring. That is to say that the nozzles of the printing head can be controlled in such a way that they only discharge material droplets when their position relative to the substrate corresponds to the position of a special point of the specific polar coordinate grid. As a consequence, a printed image which has a uniform density independently of the distance from the axis of rotation is obtained.

The grid formed by the special polar coordinate grid points can be mapped into the specific Cartesian coordinate system by virtue of a computer being present, by means of which the special polar coordinate grid points stored in the second memory are transformable into coordinates of the specific Cartesian coordinate system. What this advantageously achieves is that the pixels of the specific Cartesian coordinate grid can be compared to the transformed special polar coordinate grid points.

As a consequence, it is easily possible to determine the polar coordinate grid points at which material is applied to the substrate. Material is only applied to the substrate at those polar coordinate grid points which correspond to those special polar coordinate grid points whose points when transformed into the specific Cartesian coordinate grid correspond to the pixels of the specific Cartesian coordinate grid. As a consequence, use is only made of those pixels of the Cartesian coordinate grid whose coordinates correspond to the coordinates of the special polar coordinate grid points that are transformed into the Cartesian coordinate system. As a result, an image applied to the rotatable substrate has virtually the same material density everywhere.

Instead of the special polar coordinate grid points being transformed into coordinates of the specific Cartesian coordinate system, it is possible to transform the pixels stored in the first memory into coordinates of the specific polar coordinate grid. The comparison of the pixels with the special polar coordinate grid points then occurs in the specific polar coordinate grid. Expediently, the rays of the specific polar coordinate grid that extend through the polar coordinate points lying on the outer circle have an angular distance corresponding to the angular distance or, for example, a fraction of the angular distance that emerges when the distance of two polar coordinate points arranged on the outer circle corresponds to the nozzle distance.

In a preferred embodiment of the invention, image data for a first layer and for a second layer of a layer stack that is to be produced from at least two material droplet layers are stored in the first memory, wherein a first set and a second set with special polar coordinate grid points are stored in the second memory, wherein the polar coordinate grid points are arranged differently in the specific polar coordinate grid in these sets, and wherein, with the aid of the computer, the polar coordinate grid points of the first set are transformable into coordinates of the specific Cartesian coordinate system and the first Cartesian grid points obtained thus are comparable to the pixels or the vectors of the image data of the first layer, and the polar coordinate grid points of the second set are transformable into coordinates of the specific Cartesian coordinate system and the second Cartesian grid points obtained thus are compared to the pixels or the vectors of the image data of the second layer, or wherein, with the aid of the computer, the pixels or vectors stored in the first memory for the first layer are transformable into polar coordinates and the first polar coordinate image data obtained thus are compared to the special polar coordinate grid points of the first set stored in the second memory, and the pixels or vectors stored in the second memory for the second layer are transformable into polar coordinates and the second polar coordinate image data obtained thus are compared to the special polar coordinate grid points of the second set stored in the second memory.

The sites at which the special polar coordinate grid points are arranged are thus selected to be different for the individual material droplet layers. This is advantageous in that, in the case of circles which have gaps or holes between special polar coordinate grid points that are adjacent to one another in the circumferential direction of the circle in the layer stack on account of the specific polar coordinate grid in which the special polar coordinate grid points are arranged, said gaps or holes do not lie exactly over one another in the case of layers that lie on top of one another but instead are offset with respect to one another in the circumferential direction. As a consequence, the material applied to the substrate or the layer stack is distributed more uniformly in the circumferential direction and the formation of channels which punctuate the layer stack at the holes or gaps normally in relation to the plane of the substrate is counteracted. By way of example, the different sets with special polar coordinate grid points can be produced by virtue of the polar coordinate grid points for the individual layers being rotated relative to one another about the origin of the specific polar coordinate grid or about the axis of rotation by the angular increment by which the polar coordinate grid points are offset from one another in the circumferential direction of the circles, or by a plurality of angular increments. However, it is also conceivable to mirror the arrangement of the special polar coordinate grid points at a straight line extending through the origin.

Advantageously, the nozzles are arranged in such a way that a straight line extending through at least two nozzles extends parallel to a ray of the polar coordinate grid, wherein the straight line extending through the nozzles preferably intersects the axis of rotation or the straight extension thereof. This allows, in a simple manner, an image to be applied by means of the nozzles onto a substrate that is rotatable about an axis of rotation, the pixels of said image being arranged in the polar coordinate grid. In particular, it is possible, without problems, to arrange a plurality of printing heads in succession in the radial direction such that the region of the substrate on which material should be applied is enlarged in a simple manner. Thus, for example, four printing heads can be arranged in succession, as a result of which it is possible to provide a circular-ring-shaped region with material, said circular-ring-shaped region having four times the size of the region which can be provided with material by one printing head.

The nozzles can be arranged on a single straight line extending parallel to a ray of the polar coordinate grid or on two straight lines extending parallel to the same ray of the polar coordinate grid, said two straight lines being arranged at the same vertical distance from the substrate. In the latter case, the nozzles arranged on the one straight line preferably are offset by a gap to the nozzles arranged on the other straight line. This facilitates a dense arrangement of the nozzles.

Advantageously, the circumferential distance of the specific polar coordinate grid corresponds to the distance between two nozzles when these are arranged in a row parallel to a ray of the polar coordinate grid. The nozzle distance is selected in such a way that the material droplets discharged thereby produce a line having a uniform density.

Advantageously, the angular distance between the special points of the polar coordinate grid stored in the second memory is selected in such a way that the distance between two special points of the polar coordinate grid lying next to one another on the same circle corresponds at least to a fraction of, but preferably one times, the nozzle distance, wherein the angular distance is selected in such a way that it corresponds to a unit fraction of a full circle or a revolution. This allows the density of the material applied to the substrate to be influenced in a simple manner.

However, it should be observed that the distance should be selected in such a way that it corresponds to a unit fraction of a full circle. As a result of this, the polar coordinate grid points are again situated at exactly their initial position after a complete revolution of the substrate around the axis of rotation, as a result of which it is not necessary to return the substrate to its initial spatial orientation in a special step. This has a very advantageous effect on the processing time. An offset which would lead to unsharpness arising does not occur.

An embodiment of the invention in which the angular distance between the further rays of the specific polar coordinate grid corresponds to an integer multiple of the angular distance between the first rays is very advantageous. As a result of this, it is possible to place the special points of the polar coordinate grid very accurately.

In a preferred configuration of the invention, at least two polar coordinate grid points are assigned material droplets with a different volume, wherein respectively one volume information item for a material droplet to be discharged at the relevant polar coordinate grid point is stored in the second memory for the individual polar coordinate grid points, and wherein the apparatus is configured in such a way that the material droplets are respectively applied at the sites to be printed with a volume which corresponds to the volume information item of the relevant polar coordinate grid point stored in the second memory. As a result, the dimensions of gaps or holes in the layer stack situated between special polar coordinate grid points that are adjacent to one another in the circumferential direction of the circle can be reduced or the gaps or holes even can be avoided entirely. Material droplets with different dimensions result from the different volumes of the material droplets.

It is advantageous if first polar coordinate grid points are arranged on a first circle of the polar coordinate grid and further polar coordinate grid points are arranged on a further circle of the polar coordinate grid, if the diameter of the further circle is smaller than the diameter of the first circle, and if the volume information items stored in the second memory are selected in such way and that the sum of the volumes assigned to the polar coordinate grid points of the further circle is smaller than the sum of the volumes assigned to the polar coordinate grid points of the first circle. Preferably, the ratio of these sums approximately corresponds to the ratio of the diameters of the circles. This facilitates particularly uniform material application.

Even if, as explained above, a very homogeneous printed image also can be produced by means of the present invention, i.e. the invention can find use in printers which print a printed image onto a substrate that is rotatable about an axis of rotation, the application of the invention is particularly advantageous in the case of, in particular, printers by means of which three-dimensional articles can be produced by layer-by-layer material application. This is because the time that can be saved by the continuous rotational movement of the printing table has a very clear effect for such printers in particular. Moreover, the printing heads can be securely assembled in the application of the invention, as a result of which the printing apparatus becomes robust, has a very high stitching accuracy and a high reliability.

Moreover, it is very advantageous that the arrangement of the special polar coordinate grid points depends on the geometry of the printing apparatus, i.e., in particular, on the substrate that is rotatable about the axis of rotation and on the printing head arrangement. As result of this, the special polar coordinate grid points for a printing apparatus only have to be calculated once. As a consequence, the special polar coordinate grid points can be stored permanently in the second memory. This reduces computational outlay which has a very advantageous effect on the printing speed.

It should still be mentioned that the predetermined image data can be available as pixels of a specific Cartesian coordinate grid, the coordinate lines of which have a grid spacing from one another, or as vectors.

BRIEF DESCRIPTION OF THE DRAWINGS

Further details, features and advantages of the present invention emerge from the following description of a special exemplary embodiment, with reference being made to the drawing. In the latter, in part quite schematically.

DESCRIPTION OF THE INVENTION

Figure 1:
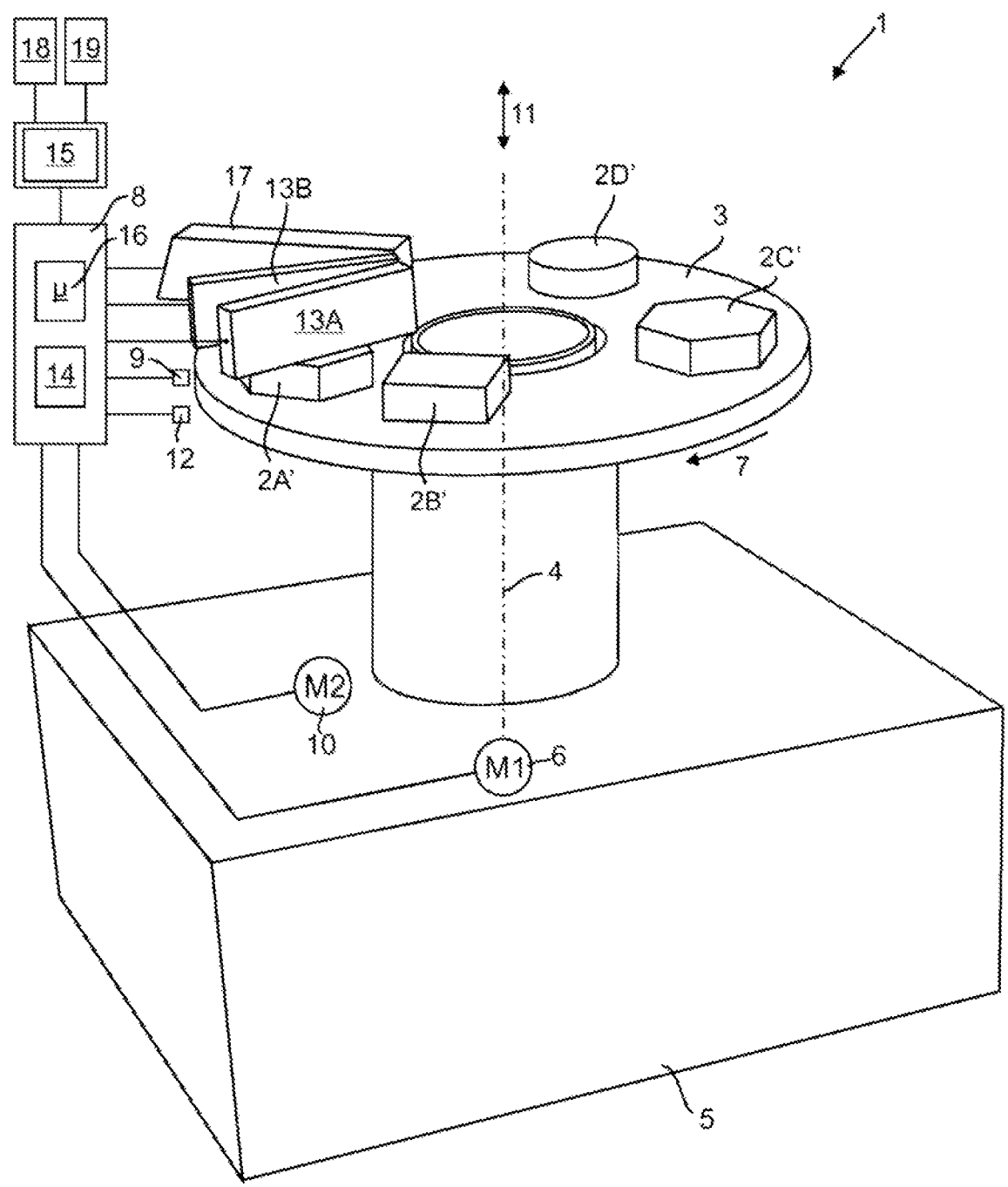
FIG. 1 shows a perspective view of an exemplary embodiment of an apparatus for the layer-by-layer production of three-dimensional shaped articles, said apparatus having a rotary disk on which a number of material layers are applied for the shaped articles.

An apparatus, denoted by 1 overall in FIG. 1, for producing three-dimensional shaped articles 2A, 2B, 2C, 2D by means of layer-by-layer material deposition has a plane substrate 3 which extends in a horizontal plane. Layer stacks 2A', 2B', 2C', 2D' for a plurality of shaped articles 2A, 2B, 2C, 2D, which each have a multiplicity of material layers, are appliable onto the substrate 3.

The substrate 3 is configured as a circular-ring-shaped rotary disk, which is mounted in a manner rotatable about a vertical axis of rotation 4 on a stationary holder 5. On its lower side, the holder 5 has a footprint, by means of which it can be set up on, for example, a tabletop or on the floor of a room.

The substrate 3 has a drive connection with a first positioning device having a first drive motor 6, by means of which the substrate 3 is rotatably drivable in the direction of the arrow 7 and positionable according to a rotational orientation intended value signal that is provided by an actuation device 8. To this end, the first drive motor 6 is connected to a first spatial orientation controller that is integrated into the actuation device 8 and that has an encoder 9 for capturing the rotational orientation of the substrate 3. The spatial orientation controller or the encoder 9 can be embodied as an incremental rotary encoder. With the aid of the first positioning device, the substrate 3 can be rotated about the axis of rotation 4 continuously, at a high rotational speed and without stopping over virtually arbitrary angles of more than 360° relative to the holder 5.

Figure 2:
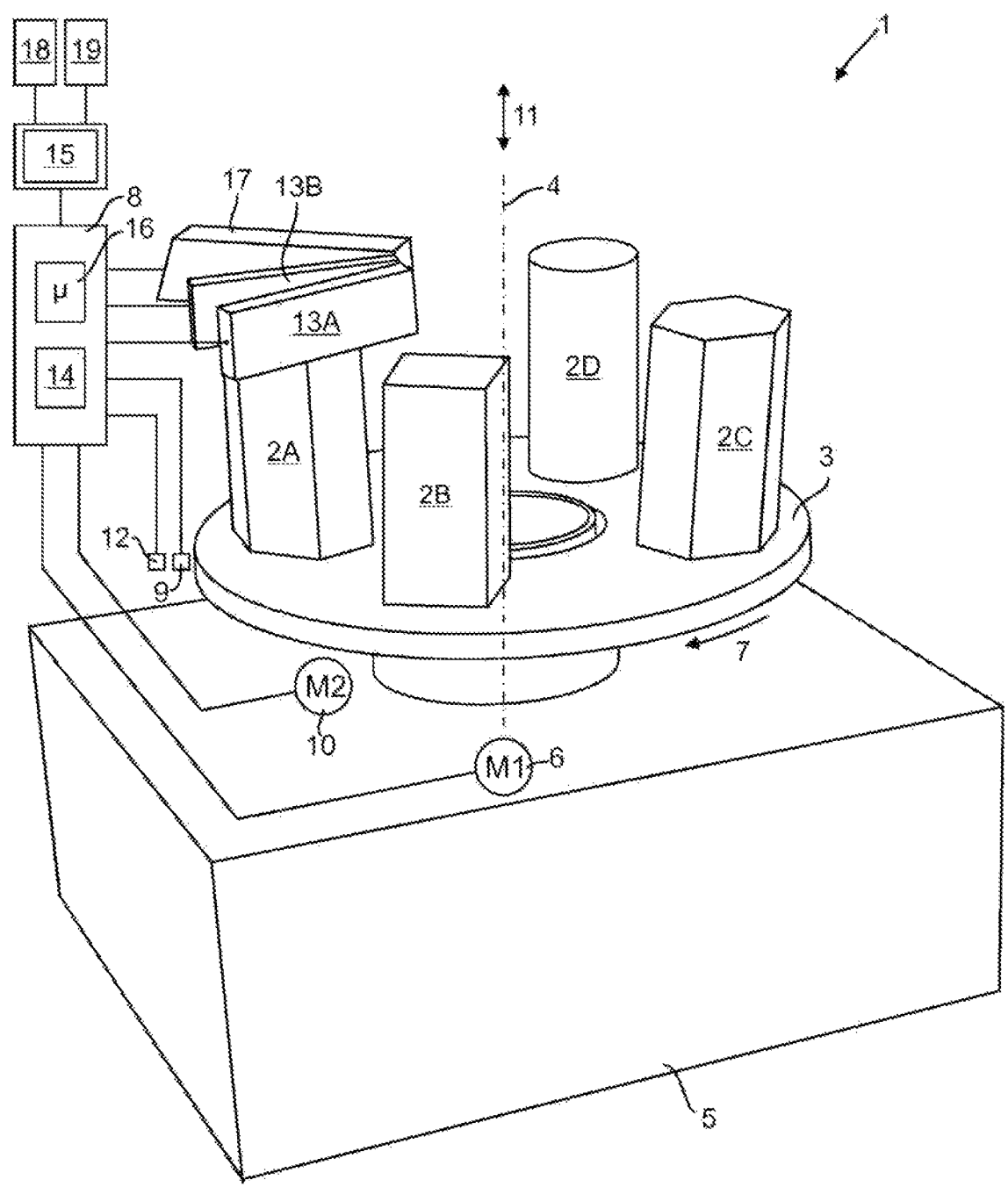
FIG. 2 shows an illustration similar to FIG. 1, after further material layers have been applied and the rotary disk has been lowered in relation to FIG. 1.

The substrate 3 moreover has a drive connection with a second positioning device having a second drive motor 10, by means of which the substrate 3 is displaceable up and down in the direction of the double-headed arrow 11 relative to the holder 5 and positionable according to an elevation intended value signal that is provided by the actuation device 8 (FIGS. 1 and 2). The positioning can be incremental or continuous. To this end, the second drive motor 10 is connected to a second spatial orientation controller that is integrated into the actuation device 8 and that has a spatial orientation sensor 12 for capturing the elevation of the substrate 3.

The apparatus 1 has two printing head arrangements 13A, 13B that are arranged in a stationary fashion on the holder 5 and each consists of four printing heads arranged in succession in the radial direction, said printing heads each having a nozzle arrangement, not illustrated in any more detail in the drawing, with a multiplicity of nozzles that are provided with controllable valves, from each of which material droplets of a flowable material, such as e.g. a polymer, adhesive, binder, etc., are dischargeable. The nozzles of the individual nozzle arrangements are respectively arranged in a row extending parallel to the plane of the substrate 3 and said nozzles face the substrate 3 with their nozzle opening. The rows in which the nozzles of the individual nozzle arrangements are arranged in each case extend approximately radially in relation to the axis of rotation 4 of the substrate 3. Each nozzle arrangement is respectively connected with a reservoir, not illustrated in any more detail in the drawing, for a flowable material supply. The reservoirs can be filled with different materials. By way of example, these may have different colors or material properties for producing two-component shaped articles. Multicolor versions are also possible.

The positioning devices and the printing head nozzles are actuatable by means of the actuation device 8 in such a way that the shaped articles 2A, 2B, 2C, 2D are producible by layer-by-layer material application. To this end, the actuation device 8 has a print buffer 14, which can store printing data for a material layer to be applied onto the substrate 3 with the aid of the printing arrangements 13A, 13B, onto a material layer situated thereon, onto a layer stack situated on the substrate 3, said layer stack having a plurality of material layers, and/or onto an article arranged on the substrate, the material layer or the layer stack.

The printing data are storable in the form of a pixel matrix in the print buffer 14, said pixel matrix having a multiplicity of pixels that are arranged accordingly in a polar coordinate system having a plurality of circles and a plurality of radial rays. The circles are arranged concentrically with the axis of rotation 4 of the substrate 3 and each has a predetermined number of pixels which are offset from one another in an angle grid in relation to the axis of rotation 4. Lines which are at a greater distance from the axis of rotation 4 of the substrate 3 have a greater number of pixels than lines that are arranged closer to the axis of rotation 4. Each printing head arrangement 13A, 13B has respectively one nozzle for each circle.

An information item is storable for each pixel in the print buffer 14, respectively for each printing head arrangement 13A, 13B, said information item having a first value (e.g. "1") when the relevant nozzle of the relevant printing head arrangement 13A, 13B is intended to discharge a material droplet at the site assigned to the pixel of the material layer to be produced. If a nozzle of the printing head arrangement 13A, 13B is not intended to discharge a material droplet at the site of the material layer assigned to the pixel, the information stored in the print buffer 14 for this pixel has a second value (e.g. "0").

For the purposes of loading the pixel matrix into the print buffer 14, the actuation device 8 is connected to an overarching computer 15, such as e.g. a PC, in which geometry data are stored for the shaped articles 2A, 2B, 2C, 2D. By way of example, the geometry data can be provided by means of CAD software that can run on the computer 15. Furthermore, software which prepares the geometry data and generates the printing data for the individual layers of the shaped articles 2A, 2B, 2C, 2D therefrom is executable on the computer 15. The pixel matrix is produced with the aid of the software in such a way that distortions are as small as possible at sites at which the geometry of the shaped articles 2A, 2B, 2C, 2D stored in a first memory 18, said geometry being available in Cartesian coordinates, deviates from the geometry that is formed by the Cartesian coordinates that are converted into polar coordinates.

This is carried out in such a way that special polar coordinate grid points 20A, 20B of the polar coordinate grid, which are arranged on circles that have a predetermined circle spacing from one another, are determined. From FIG. 3, it is clear that the polar coordinate grid points 20B have a smaller distance from the origin or the center of the circles than the polar coordinate grid points 20A. The points 20A are arranged on first rays A1 which have a first angular distance from one another. Only one first ray A1 is plotted in FIG. 3 for reasons of clarity. The points 20B are arranged on second rays A2 which have a second angular distance from one another, said second angular distance being greater than the first angular distance. That is to say, the polar coordinate grid points are arranged on further rays in the direction of the origin, said further rays having an angular distance from one another that is greater than the first angular distance. As the distance from the origin of the polar coordinate grid decreases, the angular distance increases, as a result of which the distance between the polar coordinate grid points arranged on the same circle is always the same.

The spacing of the circles corresponds to the angular distance between the nozzles of the printing heads 13A, 13B. The angular distance is variable and selected in such a way that the spacing of the special polar coordinate grid points 20A, 20B arranged on a certain circle approximately corresponds to the distance between the nozzles. That is to say that the spacing of the special polar coordinate grid points 20A, 20B which are arranged on the circle that is closest to the axis of rotation 4 is greater than the angular distance between the special polar coordinate grid points 20A, 20B that are arranged on the circle which has the greatest distance from the axis of rotation 4. An ideal angular distance, which satisfies the condition that the spacing of the special polar coordinate grid points 20A, 20B arranged on a circle approximately corresponds to the distance between the nozzles, can be calculated for each circle. Provided that the spacing of the special polar coordinate grid points 20A, 20B on the certain circle does not correspond to an integer fraction of a full circle or revolution, the angular distance is adapted by rounding such that it corresponds to an integer fraction of the full circle or revolution. The polar coordinate grid formed by the special polar coordinate grid points 20A, 20B is stored in a second memory 19.

The polar coordinates of the special polar coordinate grid points 20A, 20B are converted into Cartesian coordinates by means of the computer 15. Subsequently, the Cartesian coordinates of the image data stored in the first memory 18 are compared to the Cartesian coordinates of the converted special polar coordinate grid points 20A, 20B. The pixels whose Cartesian coordinates correspond to the Cartesian coordinates of the converted special polar coordinate grid points 20A, 20B should be printed. The pixels whose Cartesian coordinates do not correspond to the Cartesian coordinates of the converted special polar coordinate grid points 20A, 20B should not be printed. Accordingly, the relevant special polar coordinate grid points 20A, 20B are marked. The printing data obtained thus can be loaded into the print buffer from the computer 15.

Figure 3:
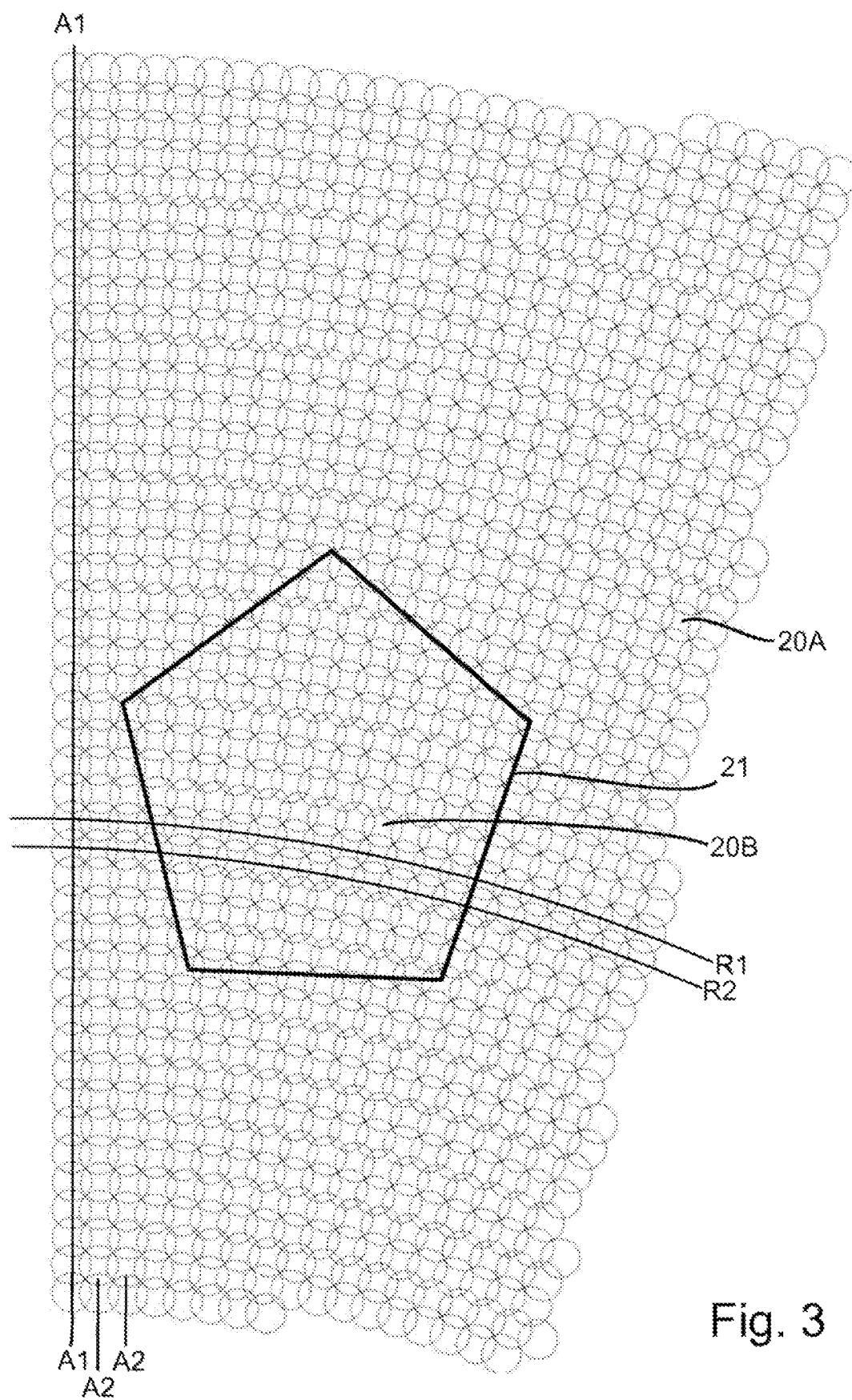
FIG. 3 shows an image arranged in a polar coordinate grid formed by special polar coordinate grid points.

FIG. 3 illustrates a grid that consists of special polar coordinate grid points 20A, 20B. The grid has radially extending rays A1, A2 and circles R1, R2. The special polar coordinate grid points 20A, 20B are arranged on a circle R1, R2, respectively at a distance from one another which corresponds to the distance between the nozzles. The special polar coordinate grid points 20A, 20B have the same distance in the radial direction. A FIG. 21 is imaged on the grid formed by the special polar coordinate grid points 20A, 20B. If the FIG. 21 is available in vectorized form, a check can be carried out as to which polar coordinates, i.e. special polar coordinate grid points 20A, 20B, lie within or outside of the image contours. For the check, it is possible to resort to a standard algorithm of graphical programs. All special polar coordinate grid points 20B situated within the image contour are provided with a material droplet, said special polar coordinate grid points forming the center of the material droplets illustrated as circles. All special polar coordinate grid points 20A situated outside of the image contour are not provided with a material droplet.

Figure 4:
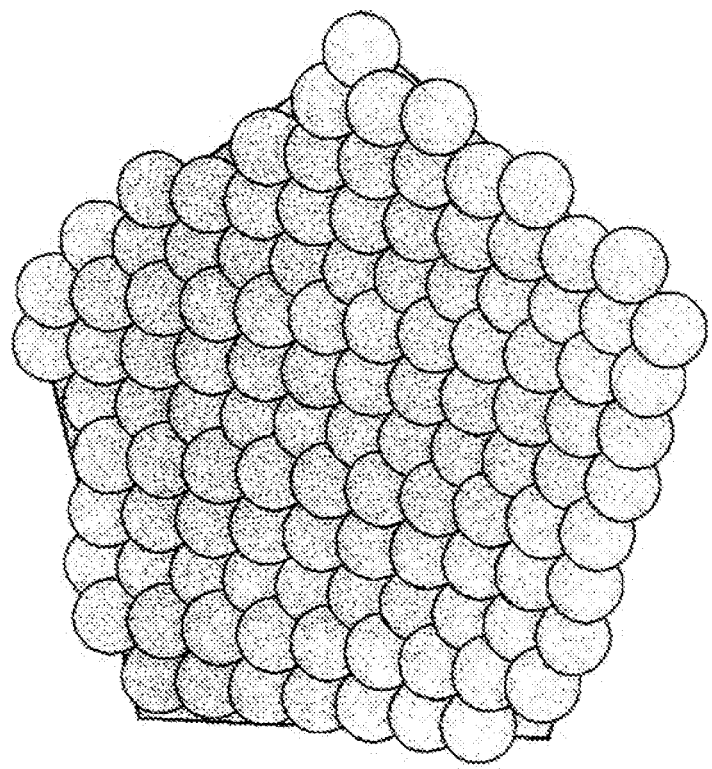
FIG. 4 shows the corresponding printed image.

As a result, the image illustrated in FIG. 4 emerges.

The actuation device 8 further has a microprocessor 16 connected to the print buffer 14, an operating program by means of which the first and second positioning device and the nozzles of the printing heads 13A, 13B are controllable in such a way that the shaped articles are producible by layer-by-layer material application being executable on said microprocessor. The operating program is stored in a memory of the actuation device 8, said memory not being illustrated in any more detail in the drawing. The actuation device 8 is connected via data or control lines to the printing heads 13A, 13B and the positioning devices.

The apparatus 1 further has a fixing device 17, which, for the purposes of fixing or crosslinking a material layer situated on the substrate 3, a material layer situated thereon and/on a layer stack situated on the substrate 3 with a plurality of material layers applied by means of the printing heads 13A, 13B, has a UV light source which is not illustrated in any more detail in the drawing and which faces the substrate 3 with its emission side. In place of the UV light source, provision can also be made of any other fixing source. The fixing device 17 is arranged in a stationary manner in relation to the holder 3 and aligned approximately radially with its direction of longitudinal extent to the axis of rotation 4 (FIG. 3).

How the shaped articles 2A, 2B, 2C, 2D are produced layer-by-layer by means of the apparatus 1 will be explained below.

The substrate 3 is positioned at a predetermined distance from the nozzle arrangements of the printing heads 13A, 13B with the aid of the second positioning device and with the aid of the spatial orientation sensor 12. The distance is selected in such a way that material droplets for a first material layer can be applied onto the substrate 3 by means of the nozzle arrangements. Moreover, the substrate 3 is brought into a predetermined rotational orientation with respect to the holder 5 with the aid of the first positioning device and with the aid of the encoder 9. Printing data for a first material layer to be produced are loaded into the print buffer 14 from the computer 15.

Now the substrate 3 is put into a rotational movement relative to the holder 5 with a predetermined, constant but selectable angular speed, in the direction of the arrow 7, while material droplets are discharged in each case with the aid of the nozzle arrangements of the printing heads 13A, 13B at those sites at which the material assigned to the printing heads 13A, 13B in each case is intended to be applied onto the substrate in order to produce a first material layer on the substrate 3. The material droplets are discharged depending on the data stored in the print buffer 14 and depending on the measurement signal from the encoder 9.

The material layer applied to the substrate 3 is solidified by the fixing device 17 by way of irradiation with UV light or the energy of another energy source. After the first material layer was completely applied, the substrate 3 is rotated further about the axis of rotation 4 at the predetermined angular speed. When the nozzle arrangements of the printing heads 13A, 13B are situated over a segment of the substrate 3 in which no material droplets should be emitted, the printing data for a further material layer, which is intended to be applied to the already completed first material layer, are loaded from the computer 15 into the print buffer 14.

It is also conceivable for the actuation device 8 to have a plurality of print buffers 14, one of which respectively contains printing data for a material layer to be produced at the current time. During the production of this material layer, the printing data for a further material layer that is to be produced at a later time can then be read into a further print buffer such that these printing data are immediately available for the production of a further material layer after the material layer that is currently being processed has been completed.

As soon as the first material layer has been completed, the substrate 3 is lowered by the thickness of the first material layer with the aid of the second positioning device such that the nozzle arrangements now are arranged at the predetermined distance from the surface of the first material layer that faces away from the substrate 3. However, the lowering may also be carried out continuously.

While the substrate 3 continues to be rotated about the axis of rotation 4, material droplets are respectively discharged with the aid of the nozzle arrangements of the printing heads 13A, 13B at the points at which the material assigned to the individual printing heads 13A, 13B should be applied to the first material layer for the purposes of applying the further material layer. Here, the material droplets are discharged, once again, depending on the data stored in the print buffer 14 and depending on the measurement signal of the encoder 9.

The aforementioned steps are repeated in a corresponding manner for applying further material layers until the shaped articles 2A, 2B, 2C, 2D are completed. Thereupon, the shaped articles 2A, 2B, 2C, 2D are removed from the substrate and the substrate is repositioned in its original spatial orientation in order to produce further shaped articles 2A, 2B, 2C, 2D where necessary.

Below, a second exemplary embodiment of the invention is explained on the basis of FIGS. 5 to 14. In this exemplary embodiment, an approximately rectangular shaped article is printed on the substrate 3 with the aid of an apparatus which corresponds to the exemplary embodiment imaged in FIGS. 1 and 2. The shaped article is applied on the substrate 3 as a layer stack 2' having a multiplicity of material layers layered on top of one another. The geometry of the shaped article is stored in the first memory 18 in the form of vectorial image data. For a layer of the layer stack, respectively corresponding vectorial image data are stored in the first memory 18.

A very small number of polar coordinate grid points 20 was selected in this exemplary embodiment for reasons of graphical displayability. It is clear from FIG. 5 that a total of seven circles R1' . . . R7' are present, on which 60 polar coordinate grid points 20 are arranged in each case. However, in practice, the number of polar coordinate grid points 20 that are arranged on the individual circles R1' . . . R7' is significantly higher. By way of example, this number may have a numerical value of 64 000. The number of circles R1' . . . R7' is also correspondingly larger than seven. This is achieved by virtue of further circles being arranged between the circles R1' . . . R7' illustrated in FIG. 5. The diameter difference of mutually adjacent circles R1' . . . R7' corresponds in each case to the spacing of the center points of printing head nozzles that are adjacent to one another radially in relation to the axis of rotation 4.

Figure 5:
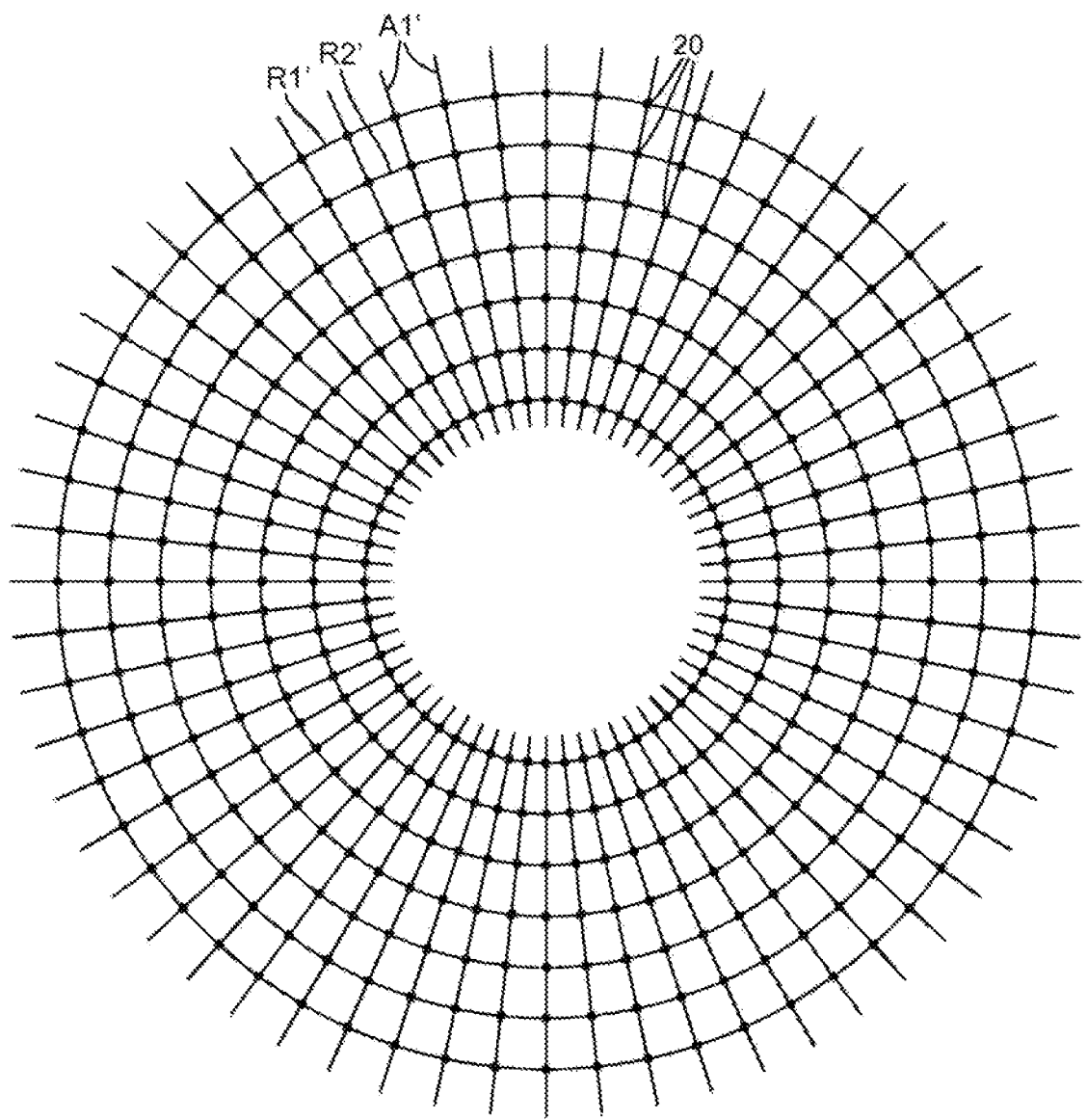
FIG. 5 shows a graphical illustration of a polar coordinate grid which has a multiplicity of polar coordinate grid points which are arranged on imaginary circles that are concentric with an origin and on a multiplicity of imaginary rays that extend radially to the origin.

It is clear from FIG. 5 that the polar coordinate grid points 20 on all circles R1' . . . R7' are respectively arranged at uniform distances from one another, i.e. the angular distance between polar coordinate grid points 20 adjacent to one another on a circle R1' . . . R7' is respectively $\alpha_1 = 360°/60 = 6°$ in the case of 60 polar coordinate grid points per circle R1' . . . R7'.

Moreover, it is clear from FIG. 5 that the polar coordinate grid points 20 are arranged on 60 straight rays A1', A2', A3', which, in the plane spanned by the polar coordinate grid points 20, extend radially to the outside from the origin of the polar coordinate grid and are offset relative to one another by the angular distance $\alpha_1$ in the circumferential direction of the circles R1' . . . R7'. The origin is situated on the axis of rotation 4 of the rotatable substrate 3. It is clear that each of the 60 rays A1', A2', A3' intersects each circle R1' . . . R7' exactly once in each case, i.e. seven points of intersection emerge on each ray A1', A2', A3', respectively one polar coordinate grid point 20 being arranged at each point of intersection.

A first set with special polar coordinate grid points 20 of the polar coordinate grid, which only comprises some of the totality of polar coordinate grid points 20 present, is stored in the second memory 19. In practice, this can be achieved by virtue of, for example, the number of memory locations of the second memory provided for the first set being smaller than the number of polar coordinate grid points 20 or by virtue of memory locations of the second memory, which correspond to a polar coordinate grid point 20 that is not a special polar coordinate grid point 20, respectively being filled by a logic value that corresponds to a "hole", for example by the logic value "0".

Figure 6:
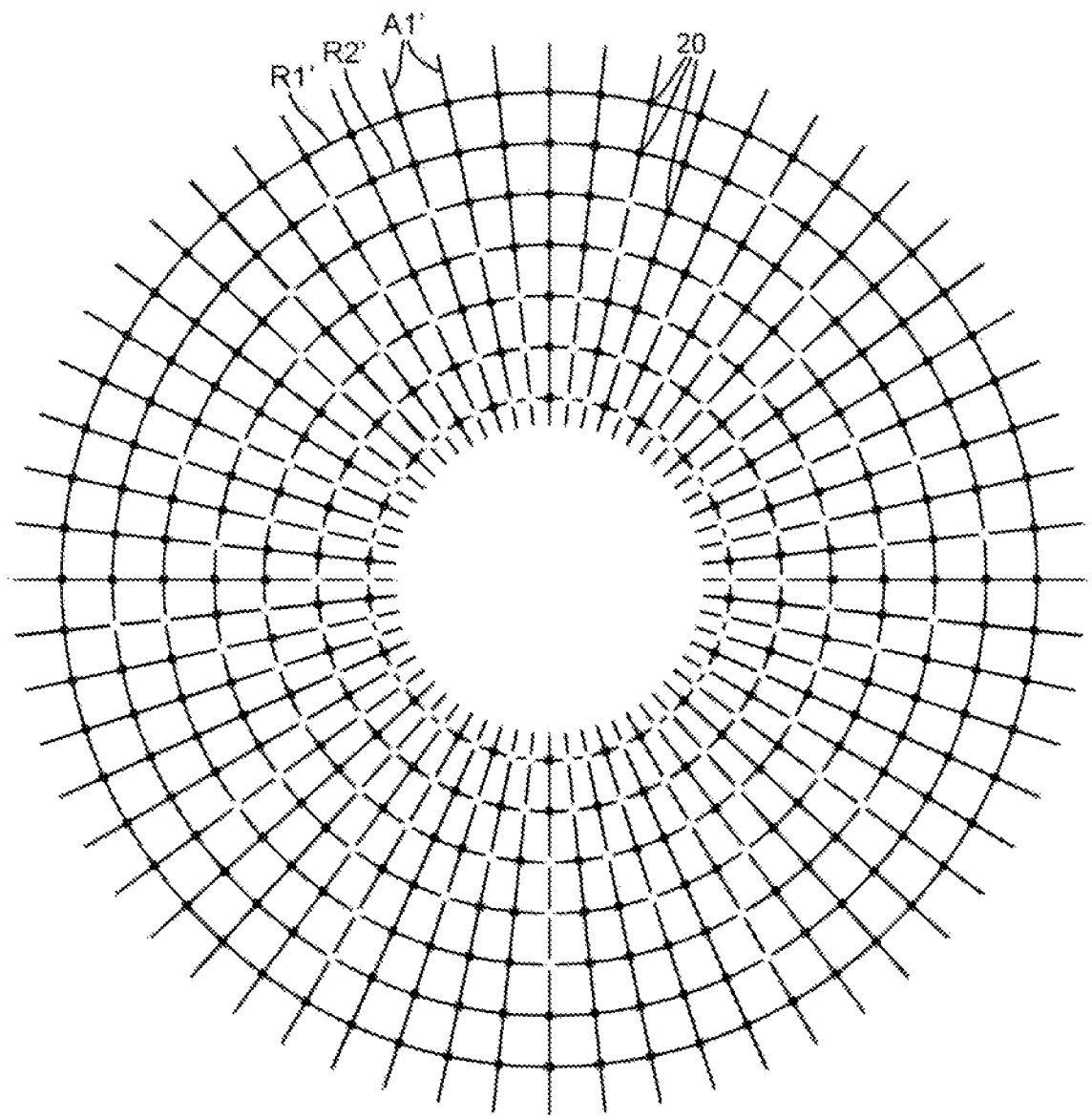
FIG. 6 shows a graphical illustration of special polar coordinate grid points of the polar coordinate grid illustrated in FIG. 5.

The arrangement of the special polar coordinate grid points 20 of the first set is visible in FIG. 6. The number of special polar coordinate grid points 20 situated on the outer circle R1' corresponds to the number of polar coordinate grid points 20 that lie on this circle R1', see FIGS. 5, 6 and 8.

The number of special polar coordinate grid points 20 of the first set which lie on the further circles R2' . . . R7' that are arranged within the outer circle R1' respectively corresponds to the number of special polar coordinate grid points 20 of this set on the outer circle R1', multiplied by the quotient of the diameter of the further circle R2' . . . R7' and the diameter of the outer circle R1'. Here, the result of this computational operation should be rounded to an integer value where necessary because only an integer number of polar coordinate grid points 20 can be arranged on a circle R1' . . . R7'. Consequently, what emerges is that the number of special polar coordinate grid points 20 that lie on the circles R1' . . . R7' reduces proceeding from the outer circle R1' to the inner circle R7', respectively from circle R1' . . . R7' to circle R1' . . . R7'; see FIGS. 9 to 14.

Figure 9:
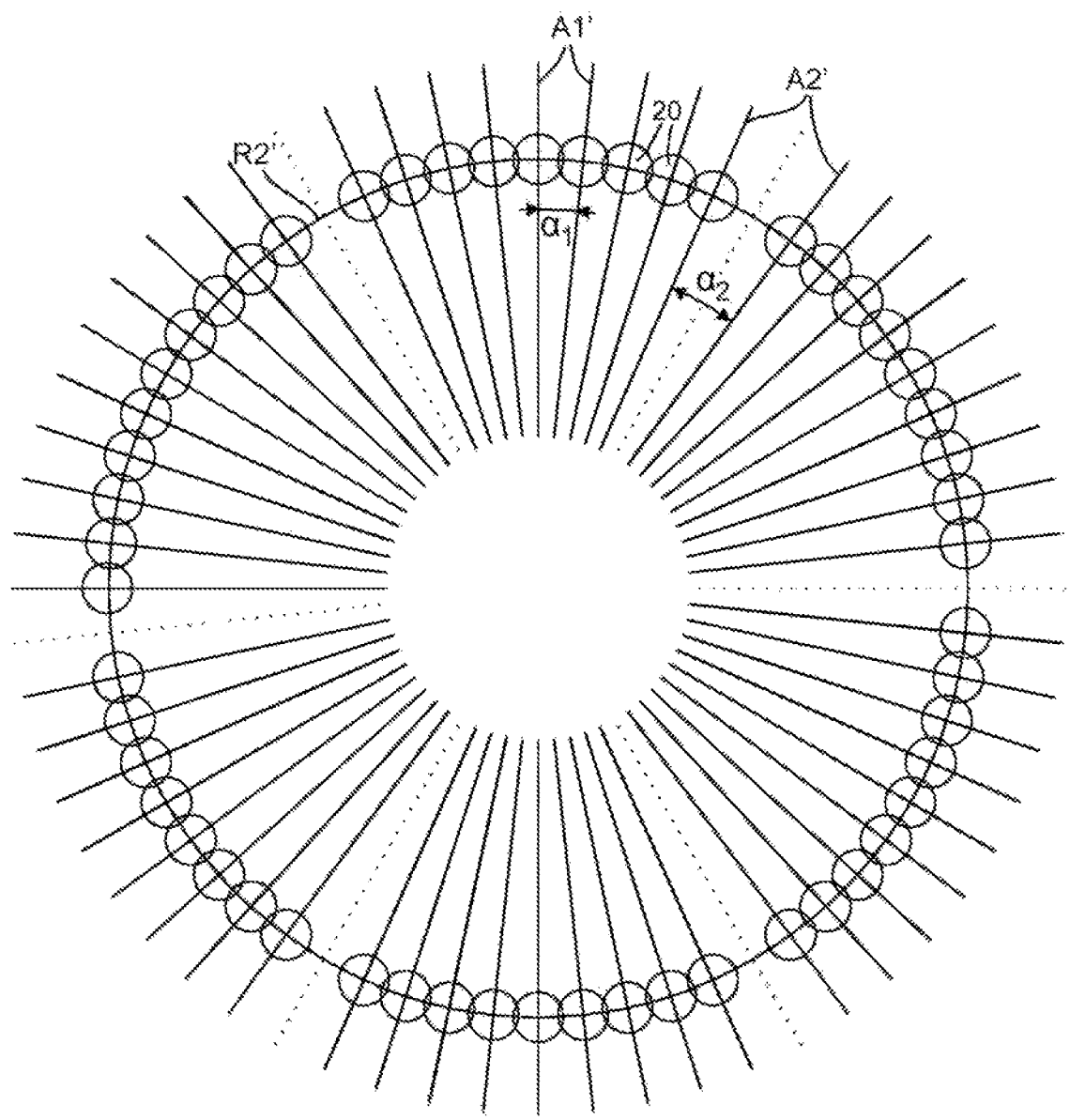
FIG. 9 shows a partial illustration of FIG. 7, which shows the material droplets discharged onto the substrate for the special polar coordinate grid points arranged on a second circle, wherein the diameter of the second circle is less than the diameter of the first circle.
Figure 10:
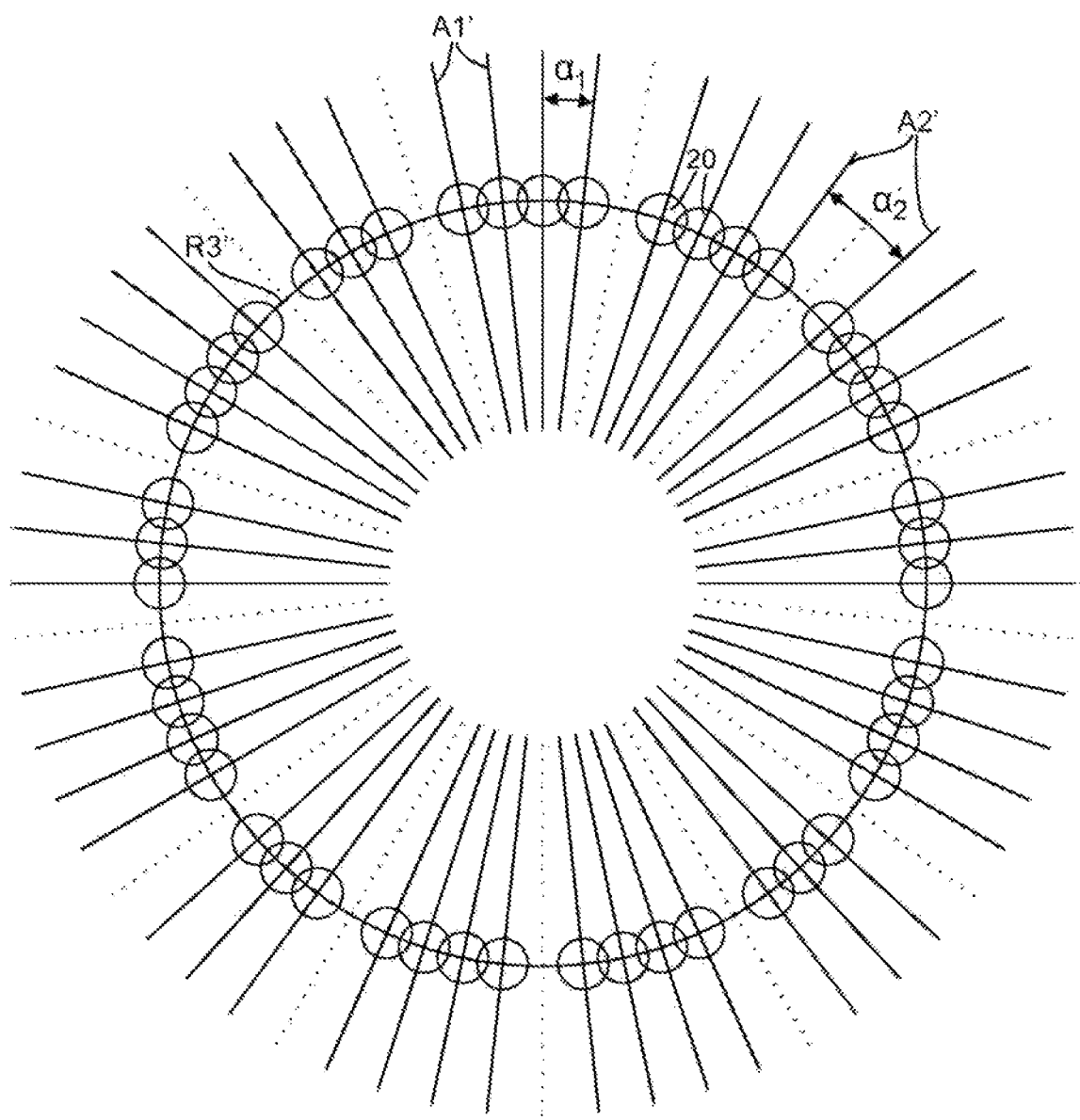
FIG. 10 shows a partial illustration of FIG. 7, which shows the material droplets discharged onto the substrate for the special polar coordinate grid points arranged on a third circle, wherein the diameter of the third circle is less than the diameter of the second circle.
Figure 11:
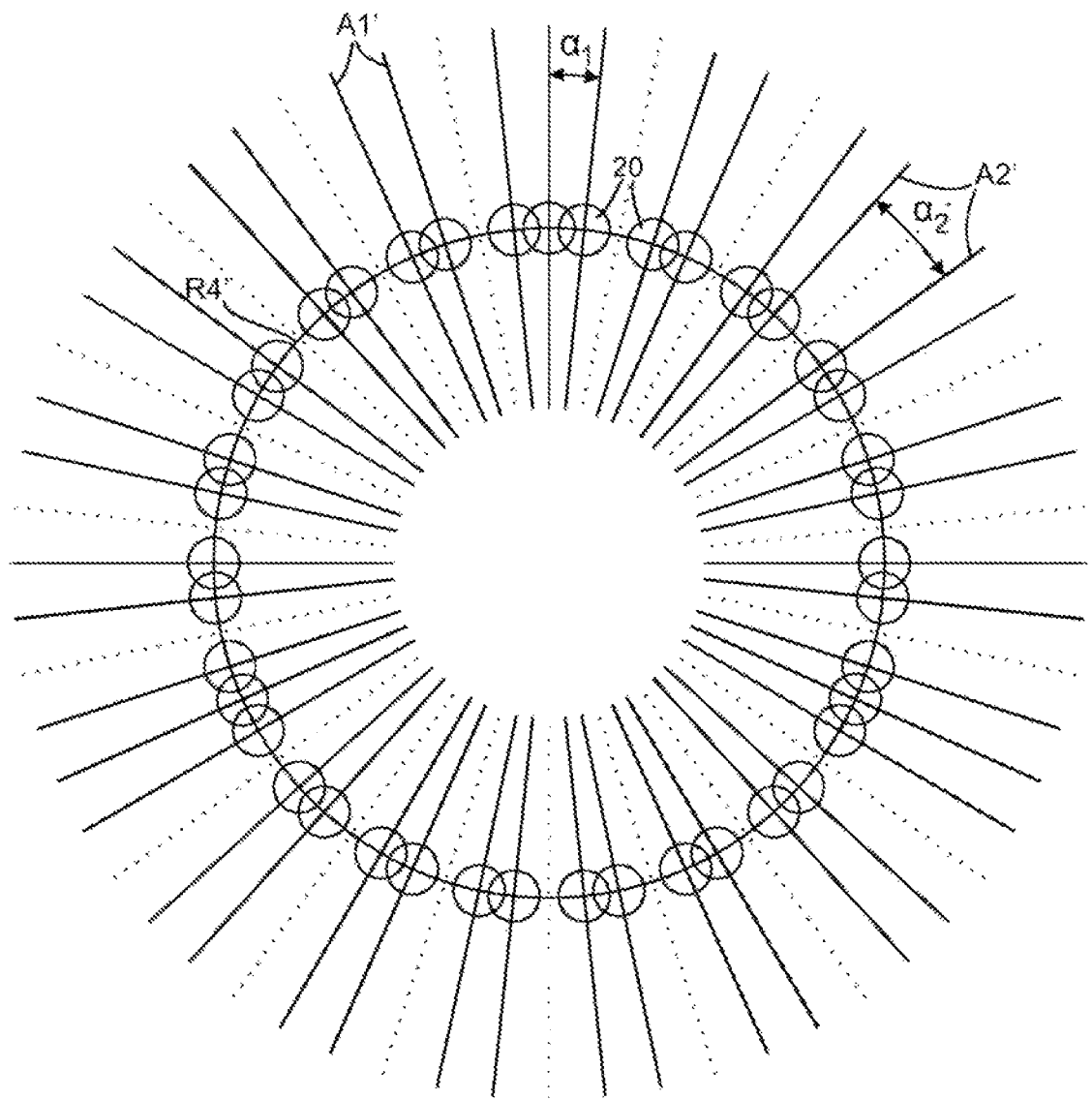
FIG. 11 shows a partial illustration of FIG. 7, which shows the material droplets discharged onto the substrate for the special polar coordinate grid points arranged on a fourth circle, wherein the diameter of the fourth circle is less than the diameter of the third circle.
Figure 12:
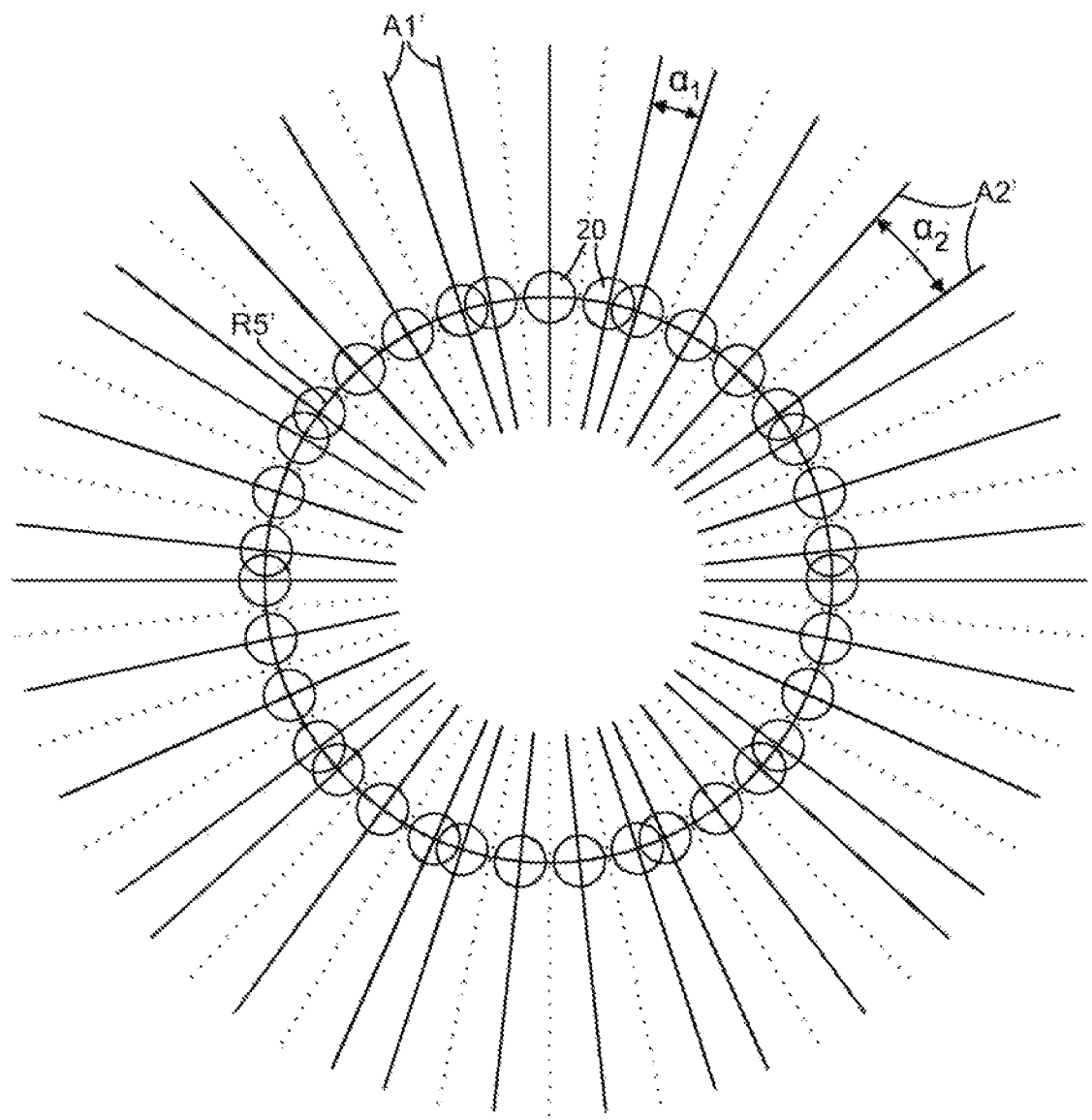
FIG. 12 shows a partial illustration of FIG. 7, which shows the material droplets discharged onto the substrate for the special polar coordinate grid points arranged on a fifth circle, wherein the diameter of the fifth circle is less than the diameter of the fourth circle.
Figure 13:
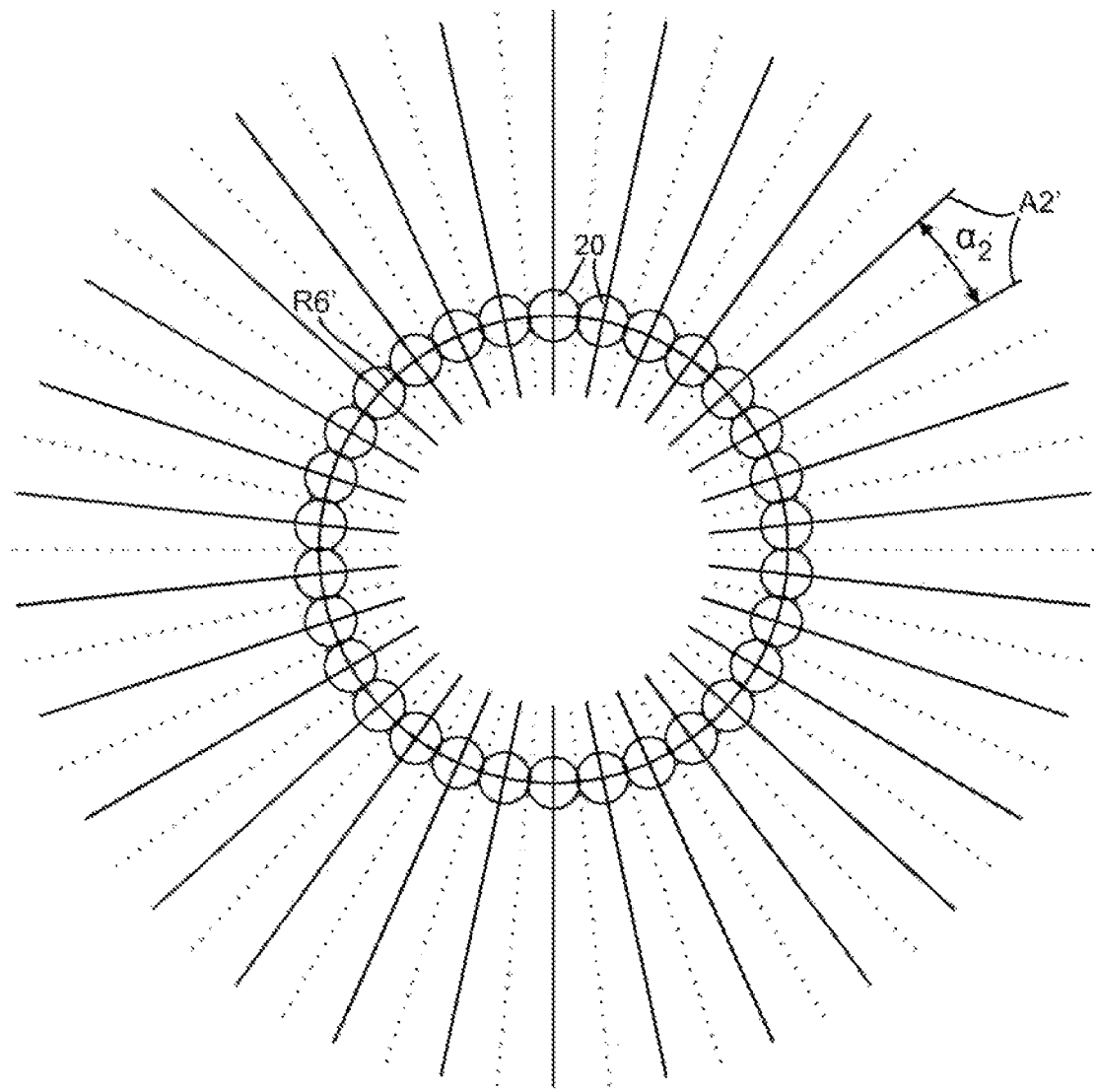
FIG. 13 shows a partial illustration of FIG. 7, which shows the material droplets discharged onto the substrate for the special polar coordinate grid points arranged on a sixth circle, wherein the diameter of the sixth circle is less than the diameter of the fifth circle.

As emerges from FIGS. 6 to 14, the special polar coordinate grid points 20 of the first set are distributed in each case with distances that are as uniform as possible along the circles R1' . . . R7'. However, since the special polar coordinate grid points 20 of the first set are arranged on the same angular grid for all circles R1' . . . R7', the angular distance for some circles R2' . . . R5', R7' cannot be selected to have the same size for all special polar coordinate grid points 20 arranged adjacent to one another in the circumferential direction on the circle R1' . . . R7'. Thus, for example, the angular distance between special polar coordinate grid points 20, which lie on the circles R2' . . . R6' illustrated in FIGS. 9 to 13, is either $\alpha_1=6°$ or $\alpha_2=12°$. In the case of the special polar coordinate grid points 20 that lie on the inner circle R7' illustrated in FIG. 14, the angular distance is between $\alpha_2=12°$ and $\alpha_2=18°$. Thus, the variation of the angular distance in the case of these circles R2' . . . R5', R7' corresponds to the angular distance $\alpha_1$ of the special polar coordinate grid points 20 lying on the outer line. Only in the circles R1', R6', imaged in FIGS. 9 and 13, is the angular distance of the special polar coordinate grid points 20 constant.

Figure 14:
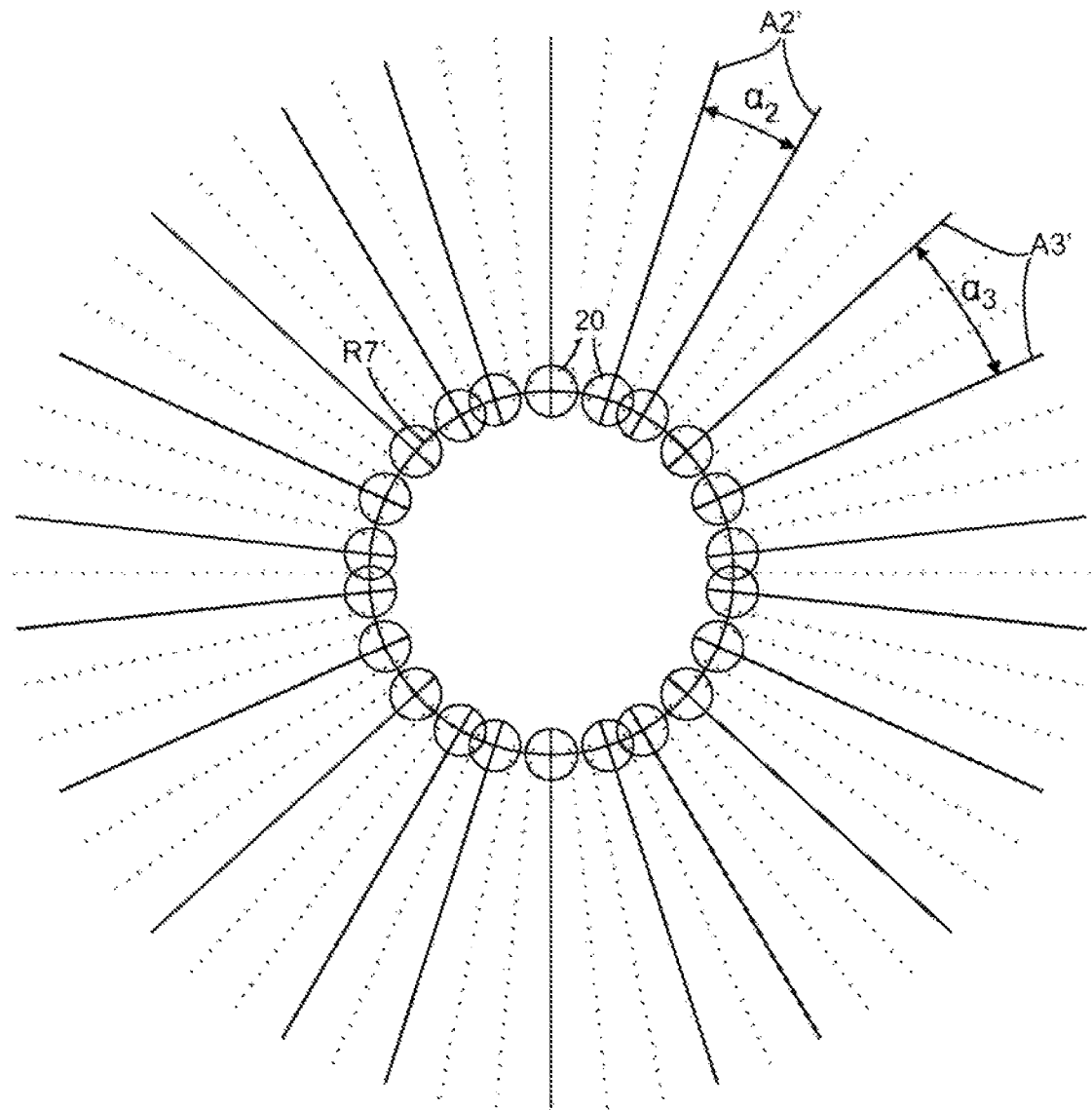
FIG. 14 shows a partial illustration of FIG. 7, which shows the material droplets discharged onto the substrate for the special polar coordinate grid points arranged on a seventh circle, wherein the diameter of the seventh circle is less than the diameter of the sixth circle.
Figure 15:
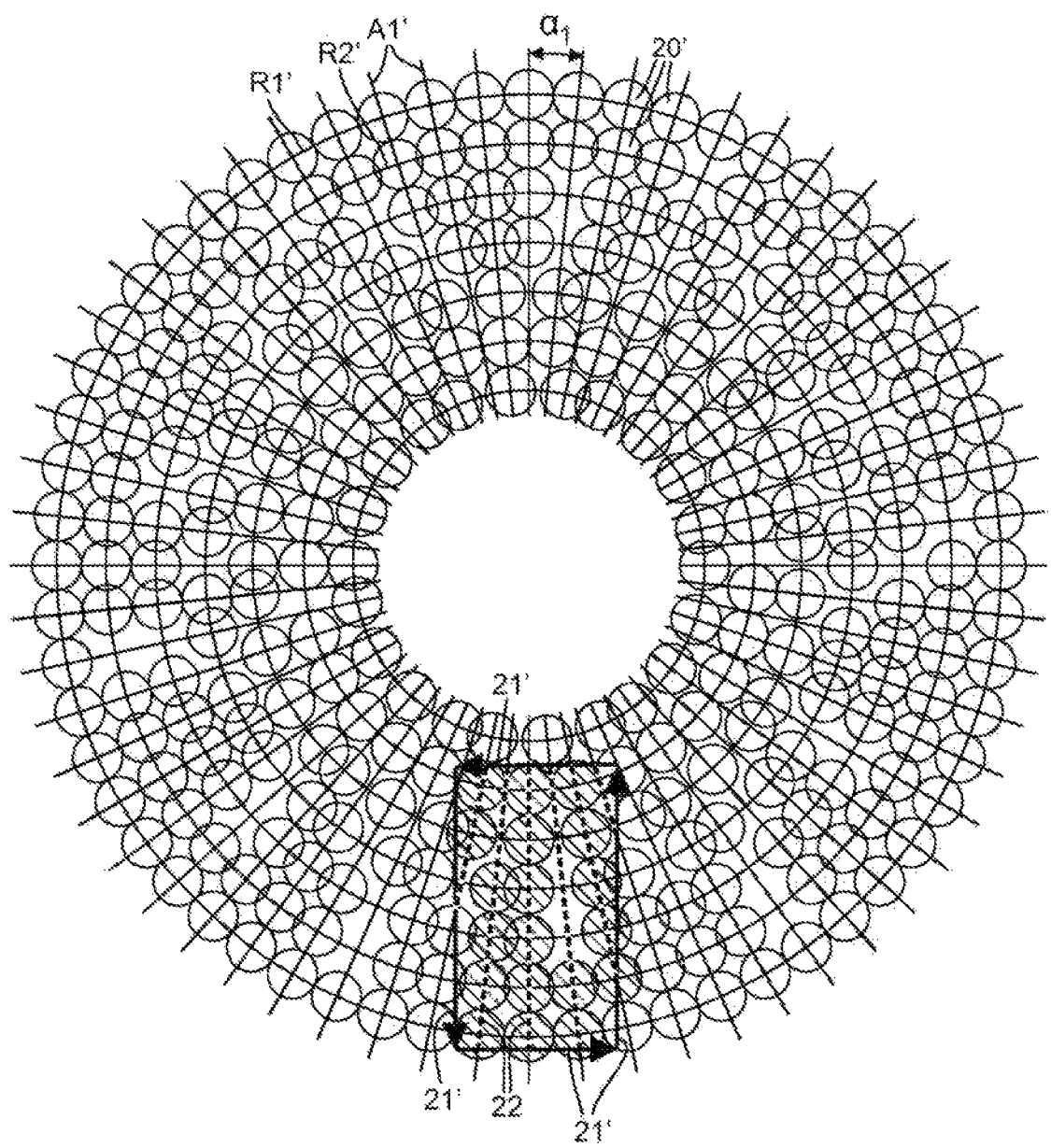
FIG. 15 shows an illustration similar to FIG. 7, wherein, however, the special polar coordinate grid points are arranged differently to FIG. 7 in the polar coordinate grid.
Figure 16:
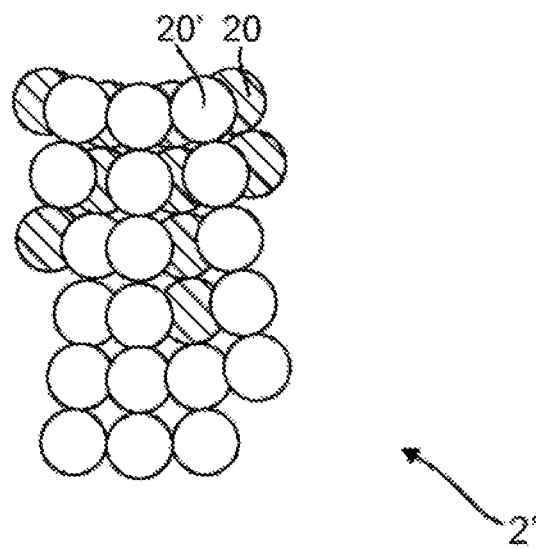
FIG. 16 shows a layer stack which has two printed layers, wherein the special polar coordinate grid points of the lower layer are illustrated with hatching and the special polar coordinate grid points of the upper layer are illustrated without hatching.

Thus, what emerges in conclusion is that the special polar coordinate grid points 20 of the first set, which lie on the outer circle R1' imaged in FIG. 9, are arranged on first rays A1', A2', A3', which have a first angular distance $\alpha_1$ from one another. At least two special polar coordinate grid points 20, which are respectively situated on one of the circles between the outer circle and the inner circle, imaged in FIGS. 9, 10, 11, 12 and 13, are respectively arranged on second rays A1', A2', A3', which have a second angular distance $\alpha_2$ from one another, which is greater than the first angular distance $\alpha_1$. At least two special polar coordinate grid points 20 of the first set, which lie on the inner circle imaged in FIG. 14, are arranged on third rays A1', A2', A3', which have a third angular distance as from one another, which is greater than the second angular distance $\alpha_2$.

Figure 7:
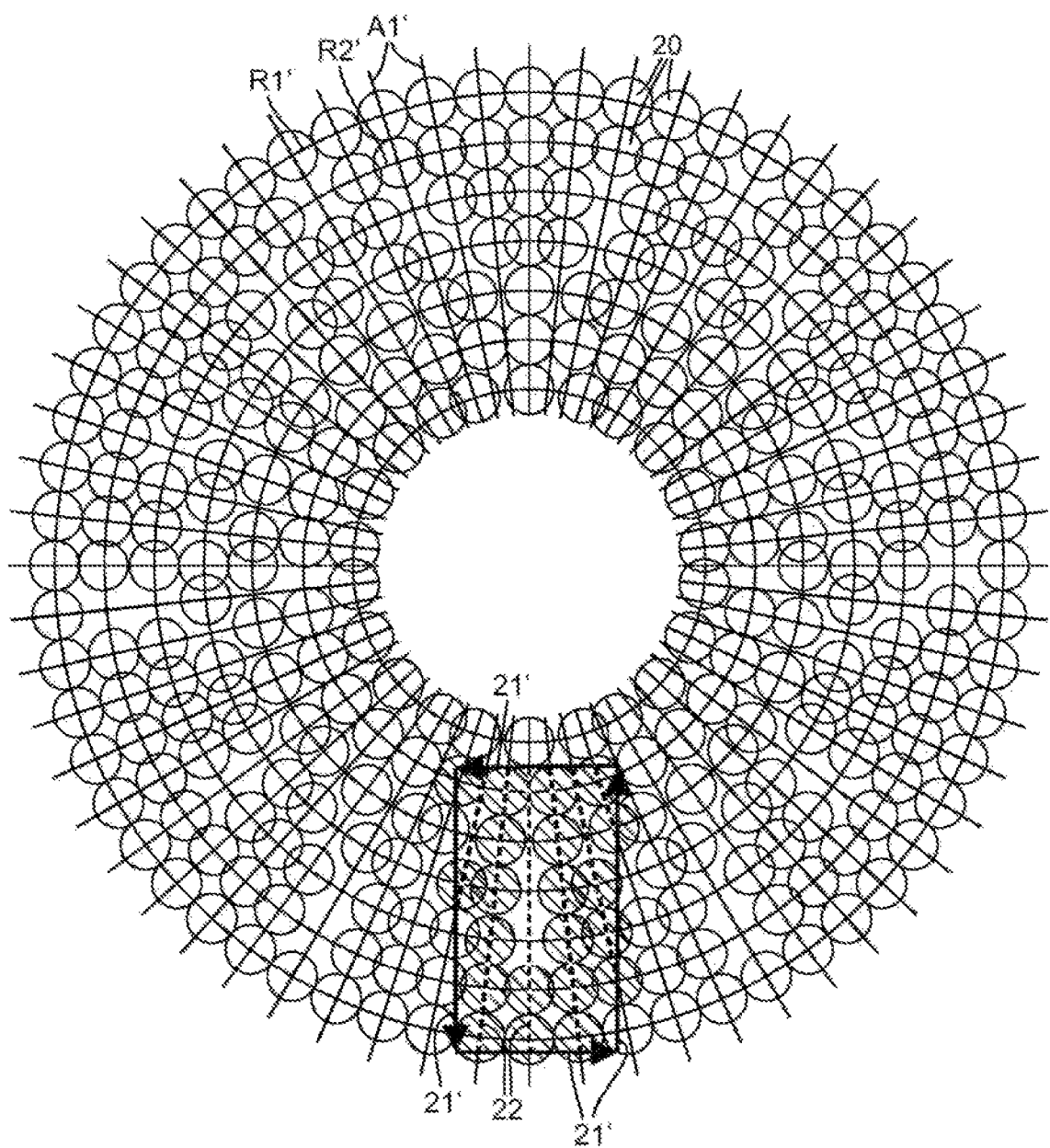
FIG. 7 shows an illustration similar to FIG. 6, wherein, however, the special polar coordinate grid points are represented by circular areas which correspond to the material droplets which are discharged by the apparatus when printing the special polar coordinate grid points onto a substrate.
Figure 8:
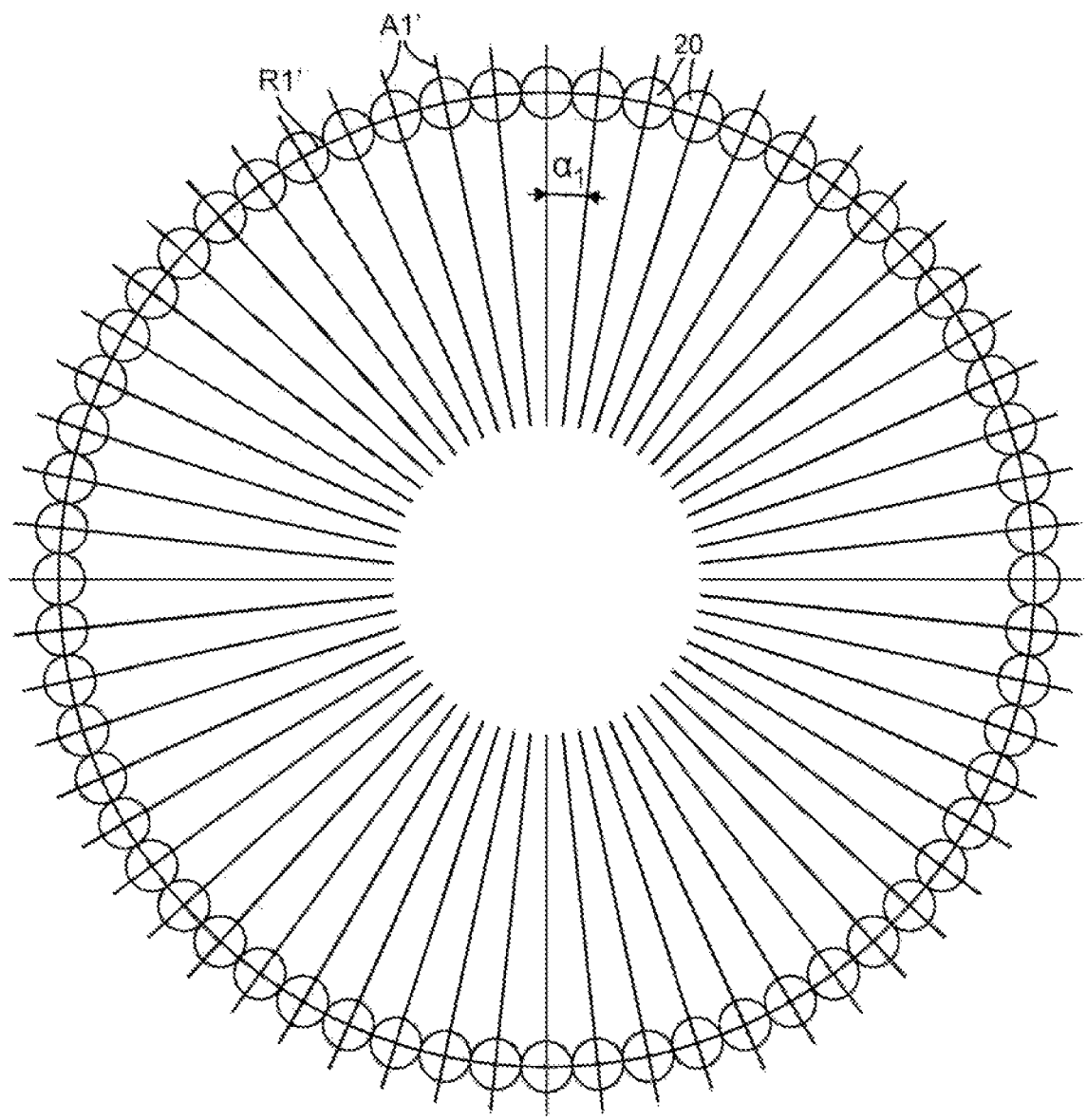
FIG. 8 shows a partial illustration of FIG. 7, which shows the material droplets discharged onto the substrate for the special polar coordinate grid points arranged on a first circle.

With the aid of the computer 15, the vectorial image data stored in the first memory 18 for the first layer are transformed into polar coordinates. FIG. 7 illustrates the image vectors 21' that have been transformed into the polar coordinates, said image vectors corresponding to the contour of the layer to be applied. The closed polygonal chain formed by the image vectors 21' is compared to the special polar coordinate grid points 20 of the first set, which are stored in the second memory 19. To this end, the sections 22 of the rays A1', A2', A3' which are situated within the polygonal chain defined by the image vectors 21' are initially ascertained. These are illustrated using dashed lines in FIG. 9. Thereupon, the special polar coordinate grid points 20 that lie on these ray sections 22 and are consequently situated within the area surrounded by the image vectors 21' are determined. For these special polar coordinate grid points 20, a material droplet is discharged onto the substrate 3 or onto a material layer applied thereon previously at the corresponding site respectively by means of the printing head. The corresponding polar coordinate grid points 20 are illustrated with hatching in FIG. 7. No material droplets are discharged for the special polar coordinate grid points 20 situated outside of the area surrounded by the image vectors 21'. These polar coordinate grid points 20 have not been illustrated with hatching in FIG. 7. The diameter with which the material droplets are applied onto the substrate 3 or onto one or more material layer(s) applied thereon previously with the aid of the printing head arrangements 13A, 13B corresponds to the diameter of the circles with which the polar coordinate grid points 20 are illustrated in FIGS. 7 to 16.

After the first layer of the layer stack 2' has been completely applied to the substrate 3, the substrate 3 is lowered relative to the printing head 13A by the layer thickness in order to apply a second layer in a corresponding manner. For the purposes of applying the second layer, use is made of the second set with special polar coordinate points 20' illustrated in FIG. 15 instead of the first set with special polar coordinate points 20 imaged in FIG. 7. As is apparent from a comparison between FIG. 7 and FIG. 15, the special polar coordinate points 20 of the first set can be converted by a rotation about the origin of the polar coordinate grid or about the axis of rotation 4 by the angle $\alpha_1$ in a counterclockwise direction. What is achieved by this is that the sites at which the polar coordinate grid does not have any polar coordinate grid points 20, or at which it does not have any "holes", are offset from one another in the circumferential direction of the circles R1' . . . R7' in the individual layers. As is clear from FIG. 16, this yields a more uniform material distribution in the layer stack 2', in which material drops of the second layer cover holes in the first layer and material drops of the first layer cover holes in the second layer.

It should also be mentioned that the image data in the exemplary embodiment shown in FIGS. 5 to 16 may also be available in the form of pixels or in the form of a bitmap in the specific Cartesian coordinate system. In this case, the pixels of the bitmap are transformed into polar coordinates with the aid of the computer and the polar coordinate image data obtained thus are compared to the special polar coordinate grid points 20, 20', 20A, 20B stored in the second memory 19. In the case of correspondence, a material drop is discharged onto the substrate 3 or onto a material layer applied thereon previously at the corresponding site by means of the printing head. The corresponding polar coordinate grid points 20 are illustrated with hatching in FIG. 7. No material drop is discharged if the comparison yields no correspondence with a polar coordinate grid point 20.

Figure 17:
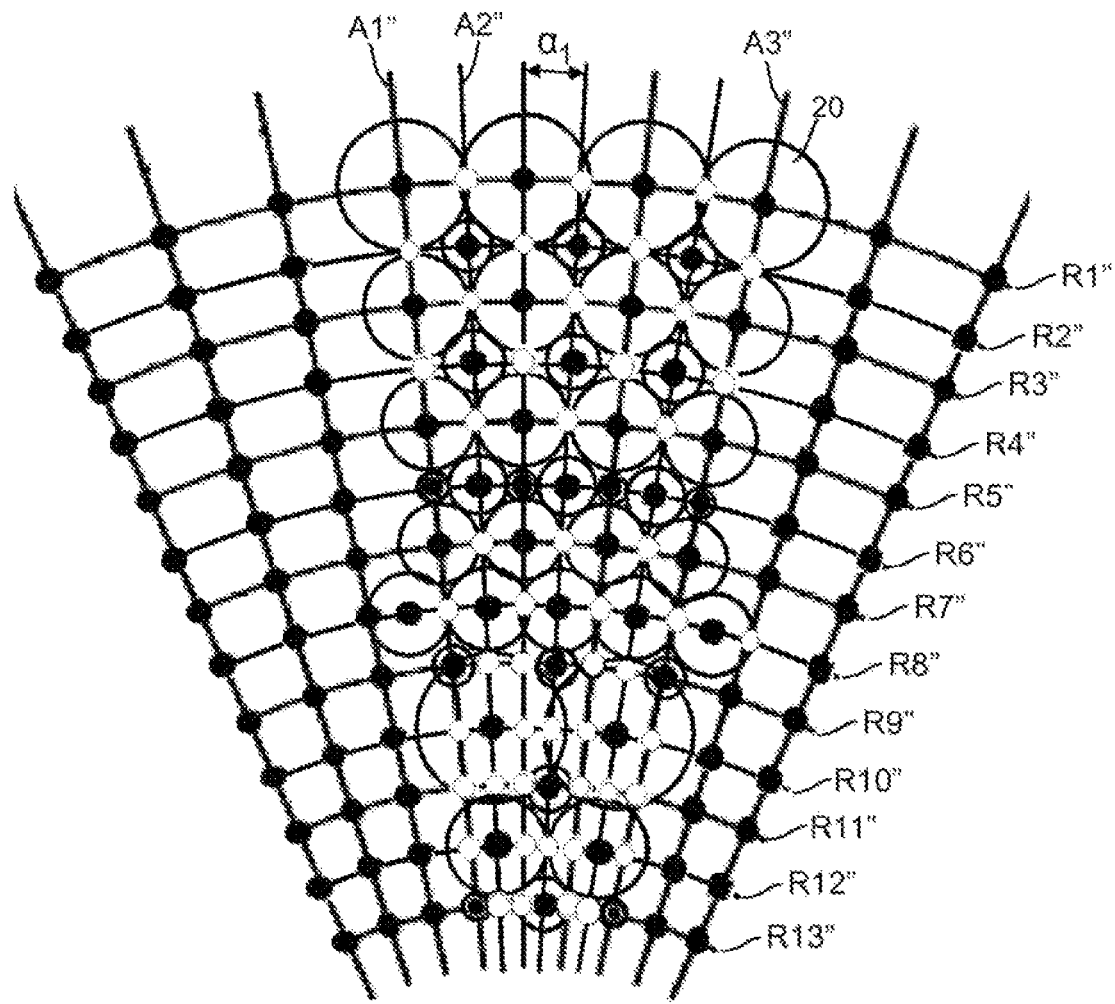
FIG. 17 shows an illustration of material droplets with different diameters discharged onto a substrate, said material droplets being arranged in a specific polar coordinate grid that is marked by circles, rays and black and white polar coordinate grid points.

In the third exemplary embodiment imaged in FIG. 17, the material droplets are applied with different diameters onto the substrate 3 or onto one or more material layer(s) previously applied thereon. In FIG. 17, the diameter of the material droplets corresponds to the diameter of the circles with which the polar coordinate grid points 20 are illustrated graphically. The different diameters of the material droplets are produced by virtue of all printing head nozzles of the printing head having the same diameter and by virtue of a number of sub-droplets that corresponds to the volume of the material droplets to be produced being discharged at the sites at which large material droplets ought to be discharged, with the aid of a printing head nozzle assigned to the relevant site, said sub-droplets fusing to form the large material droplet prior to impact on the substrate or a material layer already applied thereon. In practice, the number of sub-droplets discharged at a site to be printed may lie between e.g. 1 and 10.

A volume information item is respectively stored in the second memory 19 for the individual polar coordinate grid points 20. The apparatus 1 is configured in such a way that the material droplets are respectively produced at the sites to be printed with a volume which corresponds to the volume information item stored in the second memory 19 for the relevant polar coordinate grid point 20.

As is clear from FIG. 17, a first row of five material droplets arranged on a first ray A1" is applied onto the substrate 3, or onto a material layer applied thereon, in such a way that the volume of the material droplets reduces toward the inner end of the first row proceeding from the outer end (at the top in FIG. 17).

Moreover, a second row of four material droplets arranged on a second ray A2" is produced in such a way that the volume of the material droplets applied onto the substrate 3, or onto a material layer applied thereon, increases toward the inner end of the second row proceeding from the outer end (at the top in FIG. 17). The second ray A2" is directly adjacent to the first ray A1" in the circumferential direction of the circles R1" . . . R13". It is clear from FIG. 17 that the pattern formed by the rows is repeated along the circumferential direction of the circles R1" . . . R13", i.e. the first row and the second row alternate in the circumferential direction.

Four material droplets 20 are discharged on a segment of a first circle R1" of the polar coordinate grid that extends from a first ray A1" to a further ray A3" of the polar coordinate grid. Four further material droplets 20 are discharged on a segment of a further circle R3", the diameter of which is smaller than the diameter of the first circle R1". This segment likewise extends from the first ray A1" to the further ray A3". The sum of the volumes of the second material droplets 20 is smaller than the sum of the volumes of the first material droplets 20.

The invention claimed is:

1. An apparatus for applying flowable material onto a substrate that is rotatable about an axis of rotation, according to predetermined image data which are stored in a first memory as pixels or vectors of a specific Cartesian coordinate system, having at least one printing head which has a plurality of nozzles arranged at a nozzle distance from one another for discharging material droplets of the flowable material and which is arranged at a vertical distance from the substrate, and having an actuation device for positioning the substrate relative to the at least one printing head and for controlling the discharge of the material droplets, wherein a second memory is present, in which special polar coordinate grid points of a specific polar coordinate grid are stored, said special polar coordinate grid points being arranged on circles which have a predetermined circumferential distance from one another and being arranged on first rays which have a first angular distance from one another and being arranged on further rays in the direction of the origin, said further rays having an angular distance from one another that is greater than the first angular distance, said special polar coordinate grid points being stored as Cartesian grid points in coordinates of the specific Cartesian coordinate system, wherein a computer is present, by means of which the Cartesian grid points are compared to the pixels or the vectors of the image data, and wherein the nozzles of the printing head are controllable in such a way that they only discharge material droplets when their position relative to the substrate corresponds to the position of a special polar coordinate grid point at which the comparison yields a correspondence.

2. The apparatus as claimed in claim 1, wherein image data for a first layer and for a second layer of a layer stack that is to be produced from at least two material droplet layers are stored in the first memory, in that a first set and a second set with special polar coordinate grid points are stored in the second memory, in that the polar coordinate grid points are arranged differently in the specific polar coordinate grid in these sets, and in that, with the aid of the computer, the polar coordinate grid points of the first set are transformable into coordinates of the specific Cartesian coordinate system and the first Cartesian grid points obtained thus are comparable to the pixels or the vectors of the image data of the first layer, and the polar coordinate grid points of the second set are transformable into coordinates of the specific Cartesian coordinate system and the second Cartesian grid points obtained thus are compared to the pixels or the vectors of the image data of the second layer.

3. The apparatus as claimed in claim 1, wherein the nozzles are arranged in such a way that a straight line extending through at least two nozzles extends parallel to a ray of the polar coordinate grid.

4. The apparatus as claimed in claim 1, wherein the circumferential distance corresponds to the nozzle distance.

5. The apparatus as claimed in claim 1, wherein the angular distance between the special polar coordinate grid points stored in the second memory is selected in such a way that the distance between two special polar coordinate grid points of the polar coordinate grid lying next to one another on the same circle corresponds to at least 0.6-times, preferably 0.8-times, in particular one times the nozzle distance, wherein the angular distance is selected in such a way that it corresponds to a unit fraction of a full circle or a revolution.

6. The apparatus as claimed in claim 1, wherein the angular distance between the further rays of the specific polar coordinate grid corresponds to an integer multiple of the angular distance between the first rays.

7. The apparatus as claimed in claim 1, wherein at least two polar coordinate grid points are assigned material droplets with a different volume, in that respectively one volume information item for a material droplet to be discharged at the relevant polar coordinate grid point is stored in the second memory for the individual polar coordinate grid points, and in that the apparatus is configured in such a way that the material droplets are respectively applied at the sites to be printed with a volume which corresponds to the volume information item stored in the second memory for the relevant polar coordinate grid point.

8. The apparatus as claimed in claim 7, wherein first polar coordinate grid points are arranged on a first circle of the polar coordinate grid and further polar coordinate grid points are arranged on a further circle of the polar coordinate grid, in that the diameter of the further circle is smaller than the diameter of the first circle, and in that the volume information items stored in the second memory are selected in such way and that the sum of the volumes assigned to the polar coordinate grid points of the further circle is smaller than the sum of the volumes assigned to the polar coordinate grid points of the first circle.

9. An apparatus for applying flowable material onto a substrate that is rotatable about an axis of rotation, according to predetermined image data which are stored in a first memory as pixels or vectors of a specific Cartesian coordinate system, having at least one printing head which has a plurality of nozzles arranged at a nozzle distance from one another for discharging material droplets of the flowable material and which is arranged at a vertical distance from the substrate, and having an actuation device for positioning the substrate relative to the at least one printing head and for controlling the discharge of the material droplets, wherein a second memory is present, in which special polar coordinate grid points of a specific polar coordinate grid are stored, said special polar coordinate grid points being arranged on circles which have a predetermined circumferential distance from one another and being arranged on first rays which have a first angular distance from one another and being arranged on further rays in the direction of the origin, said further rays having an angular distance from one another that is greater than the first angular distance, wherein a computer is present, by means of which the pixels or vectors stored in the first memory are transformable into polar coordinates and the polar coordinate image data obtained thus are compared to the special polar coordinate grid points stored in the second memory, and wherein the nozzles of the printing head are controllable in such a way that they only discharge material droplets when their position relative to the substrate corresponds to the position of a special polar coordinate grid point at which the comparison yields a correspondence.

10. The apparatus as claimed in claim 9, wherein image data for a first layer and for a second layer of a layer stack that is to be produced from at least two material droplet layers are stored in the first memory, in that a first set and a second set with special polar coordinate grid points are stored in the second memory, in that the polar coordinate grid points are arranged differently in the specific polar coordinate grid in these sets, and in that, with the aid of the computer, the pixels or vectors stored in the first memory for the first layer are transformable into polar coordinates and the first polar coordinate image data obtained thus are compared to the special polar coordinate grid points of the first set stored in the second memory, and the pixels or vectors stored in the second memory for the second layer are transformable into polar coordinates and the second polar coordinate image data obtained thus are compared to the special polar coordinate grid points of the second set stored in the second memory.

* * * * *

UNITED STATES PATENT AND TRADEMARK OFFICE
CERTIFICATE OF CORRECTION

PATENT NO. : 11,602,901 B2
APPLICATION NO. : 17/410218
DATED : March 14, 2023
INVENTOR(S) : Hans Mathea It is certified that error appears in the above-identified patent and that said Letters Patent is hereby corrected as shown below:

On the Title Page

Column 1, Item (73) Assignee, Line 1, delete "Eggenstein-Leopoldshafe" and insert
-- Eggenstein-Leopoldshafen --

Signed and Sealed this
Ninth Day of April, 2024

Katherine Kelly Vidal
*Director of the United States Patent and Trademark Office*